US012770876B2

(12) United States Patent
Yasumiishi et al.

(10) Patent No.: US 12,770,876 B2
(45) Date of Patent: Oct. 20, 2026

(54) ELECTRODE, SECONDARY BATTERY, BATTERY PACK, AND VEHICLE

(71) Applicant: KABUSHIKI KAISHA TOSHIBA, Tokyo (JP)

(72) Inventors: Hirofumi Yasumiishi, Kawasaki Kanagawa (JP); Yuta Kanai, Yokohama Kanagawa (JP); Tetsuya Sasakawa, Yokohama Kanagawa (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 697 days.

(21) Appl. No.: 17/823,818

(22) Filed: Aug. 31, 2022

(65) Prior Publication Data

US 2023/0299287 A1 Sep. 21, 2023

(30) Foreign Application Priority Data

Mar. 17, 2022 (JP) ................................ 2022-042845

(51) Int. Cl.
*H01M 4/583* (2010.01)
*H01M 4/36* (2006.01)
(Continued)

(52) U.S. Cl.
CPC ........... *H01M 4/583* (2013.01); *H01M 4/366* (2013.01); *H01M 4/505* (2013.01); *H01M 4/525* (2013.01);
(Continued)

(58) Field of Classification Search
CPC ...... H01M 4/583; H01M 4/366; H01M 4/505; H01M 4/525; H01M 10/0525; H01M 2004/021; H01M 2220/20
See application file for complete search history.

(56) References Cited

U.S. PATENT DOCUMENTS 10,468,199 B2 11/2019 Kusuzaka et al.
2007/0009801 A1 1/2007 Inagaki et al.
(Continued)

FOREIGN PATENT DOCUMENTS

CN 105378987 A 3/2016
CN 111801832 A 10/2020
(Continued)

OTHER PUBLICATIONS

Japan Patent Office, Office Action in JP App. No. 2022-042845 (May 7, 2025).
(Continued)

*Primary Examiner* — Niki Bakhtiari
(74) *Attorney, Agent, or Firm* — Finnegan, Henderson, Farabow, Garrett & Dunner, LLP

(57) ABSTRACT

According to one embodiment, provided is an electrode including an active material-containing layer that includes an active material, inorganic solid particles having lithium ion conductivity, and a carbon material. The active material-containing layer has a first peak corresponding to a maximum log differential intrusion in a log differential intrusion distribution curve according to mercury porosimetry. A pore size diameter $D_1$ at the first peak is 0.05 μm to 10 μm. A first pore volume corresponding to the first peak is 20% to 50% with respect to a total pore volume within the active material-containing layer. A ratio of a second pore volume in a range of 0.005 μm to 0.02 μm relative to the first pore volume is 0.1% to 5%.

8 Claims, 10 Drawing Sheets

(51) Int. Cl.

| | |
|---|---|
| ***H01M 4/505*** | (2010.01) |
| ***H01M 4/525*** | (2010.01) |
| ***H01M 10/052*** | (2010.01) |
| ***H01M 10/0525*** | (2010.01) |
| *H01M 4/02* | (2006.01) |

(52) U.S. Cl.

CPC .. *H01M 10/0525* (2013.01); *H01M 2004/021* (2013.01); *H01M 2220/20* (2013.01)

(56) References Cited

U.S. PATENT DOCUMENTS

| | | | |
|---|---|---|---|
| 2012/0288759 | A1* | 11/2012 | Nagai et al. |
| 2014/0220437 | A1* | 8/2014 | Inagaki et al. |
| 2016/0372749 | A1 | 12/2016 | Iida et al. |
| 2020/0303765 | A1* | 9/2020 | Takami et al. |
| 2021/0005863 | A1 | 1/2021 | Nakazawa et al. |
| 2021/0083268 | A1 | 3/2021 | Kusama et al. |
| 2021/0083269 | A1* | 3/2021 | Kusama et al. |
| 2021/0210758 | A1 | 7/2021 | Saimen et al. |

FOREIGN PATENT DOCUMENTS

| | | | |
|---|---|---|---|
| CN | 112510189 | A | 3/2021 |
| JP | 2007-18882 | A | 1/2007 |
| JP | 2015118945 | A | 6/2015 |
| JP | 2018-61037 | | 4/2018 |
| JP | 2020-47387 | A | 3/2020 |
| JP | 2021-44216 | | 3/2021 |
| JP | 2021-44216 | A | 3/2021 |
| JP | 2021-44221 | A | 3/2021 |
| WO | WO 2019/225387 | A1 | 11/2019 |

OTHER PUBLICATIONS

State Intellectual Property Office of People's Republic of China, Office Action in CN App. No. 202211060162.5 (Mar. 6, 2026).

* cited by examiner

ELECTRODE, SECONDARY BATTERY, BATTERY PACK, AND VEHICLE

CROSS-REFERENCE TO RELATED APPLICATION

This application is based upon and claims the benefit of priority from prior Japanese Patent Application No. 2022-042845 filed Mar. 17, 2022, the entire contents of which are incorporated herein by reference.

FIELD

Embodiments relate to an electrode, secondary battery, battery pack, and vehicle.

BACKGROUND

In recent years, as a high energy density battery, secondary batteries such as a lithium-ion secondary battery or a nonaqueous electrolyte secondary battery have been developed. The secondary battery is anticipated for use as a power source for vehicles such as a hybrid electric automobile and an electric automobile, or as a large-sized power source for power storage. When the secondary battery is used as the power source for vehicles, the secondary battery is demanded to achieve rapid charge/discharge performance and long-term reliability or the like in addition to the high energy density.

Rapid charge and discharge is enabled by lithium ions and electrons rapidly moving respectively through an electrolyte and an external circuit, between a positive electrode and a negative electrode that are able to have lithium ions and electrons be inserted and extracted. The battery capable of performing rapid charge/discharge has the advantage that a charging time is considerably short. When the battery capable of performing rapid charge/discharge is used as the power source for vehicles, the motive performances of the automobile can be improved, and the regenerative energy of motive force can be efficiently recovered.

As a method for enhancing the input/output performance of a secondary battery, mixing of a solid polymer electrolyte into the electrode(s) has been reported.

DETAILED DESCRIPTION

Figure 1:
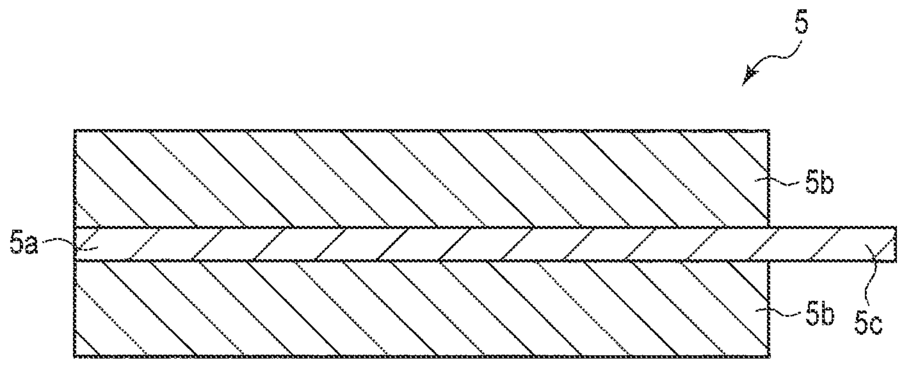
FIG. 1 is a cross-sectional view schematically showing an example of an electrode according to an embodiment.

According to one embodiment, provided is an electrode including an active material-containing layer that includes an active material, inorganic solid particles having lithium ion conductivity, and a carbon material. The active material-containing layer has a first peak corresponding to a maximum log differential intrusion in a log differential intrusion distribution curve according to mercury porosimetry. A pore size diameter $D_1$ at the first peak is 0.05 μm to 10 μm. A first pore volume corresponding to the first peak is 20% to 50% with respect to a total pore volume within the active material-containing layer. A ratio of a second pore volume in a range of 0.005 μm to 0.02 μm relative to the first pore volume is 0.1% to 5%.

According to another embodiment, provided is a secondary battery including a positive electrode, a negative electrode, and an electrolyte. At least one of the positive electrode and the negative electrode includes the electrode according to the above embodiment.

According to a further other embodiment, provided is a battery pack including the secondary battery according to the above embodiment.

According to still another embodiment, provided is a vehicle including the battery pack according to the above embodiment.

One method of improving input/output performance of an electrode is mixing of inorganic solid particles having lithium ion conductivity, such as solid electrolyte particles, into the active material-containing layer. The solid electrolyte particles are superior in lithium ion conductivity as compared to active materials. When solid electrolyte particles are blended in, lithium ion conductive resistance within the active material-containing layer can be lowered. The effect of lowering the lithium ion conductive resistance is exhibited more readily when the solid electrolyte particles have higher specific surface area. On the contrary, if the solid electrolyte particles are made into fine particles so as to increase the specific surface area, the solid electrolyte is apt to aggregate, whereby uniform distribution within the active material-containing layer becomes difficult.

Hereinafter, embodiments will be described with reference to the drawings. The same reference signs are applied to common components throughout the embodiments and overlapping explanations are omitted. Each drawing is a schematic view for explaining the embodiment and promoting understanding thereof; though there may be differences in shape, size and ratio from those in an actual device, such specifics can be appropriately changed in design taking the following explanations and known technology into consideration.

First Embodiment

According to a first embodiment, an electrode is provided. The electrode includes an active material-containing layer including an active material, inorganic solid particles having lithium ion conductivity, and a carbon material. A log differential intrusion distribution curve for the active material-containing layer obtained according to mercury porosimetry includes a first peak exhibiting maximum log differential intrusion. A pore size diameter $D_1$ corresponding to a peak top position of the first peak is within a range of 0.05 μm to 10 μm. Among a total pore volume within the active material-containing layer, a proportion of a first pore volume corresponding to the first peak is 20% to 50%. A ratio of a second pore volume in a range of 0.005 μm to 0.02 μm to the first pore volume is 0.1% to 5%.

The electrode according to the embodiment may be an electrode for a battery, for example. The battery, for which the electrode is used, may be a secondary battery such as a lithium secondary battery, for example. The secondary battery as described herein includes nonaqueous electrolyte secondary batteries containing nonaqueous electrolyte(s). As a specific example, the electrode may be an electrode for a nonaqueous electrolyte battery, having an active material-containing layer (electrode layer) disposed on a foil-shaped current collector (current collector foil). The electrode may be included in a battery as a positive electrode and/or a negative electrode.

The active material-containing layer includes the active material, inorganic solid particles having lithium ion conductivity, and carbon material as an electro-conductive agent. In addition to the active material, inorganic solid particles, and carbon material, the active material-containing layer may further include, for example, other electrode-conductive agents and a binder.

Since the electrode according to the embodiment includes the inorganic solid particles having lithium ion conductivity, the active material-containing layer has a low lithium ion conductive resistance. In addition, since the carbon material is included, an increase in electronic conductive resistance due to mixing in the inorganic solid particles can be diminished. Furthermore, the inorganic solid particles are dispersed well within the active material-containing layer in which the pore size diameter $D_1$ of the first peak is within a range of 0.05 μm to 10 μm, the first pore volume of the peak accounts for 20% to 50% (0.2 to 0.5) of the total pore volume of the active material-containing layer, and the ratio of the second pore volume, obtained by summing volumes of pores having pore size diameters of 0.005 μm to 0.02 μm, to the first pore volume is 0.1% to 5% (0.001 to 0.05). Therefore, the lithium ion conductive resistance can be reduced uniformly throughout the entire active material-containing layer. Thus, by using the electrode according to the embodiment, input/output performance of the secondary battery can be enhanced.

The electrode may further include a current-collector. The active material-containing layer may be disposed on at least one principal surface of the current collector, for example. The active material-containing layer may be disposed on one principal surface of the current collector. Alternatively, the active material-containing layer may be disposed on two principal surfaces of the current collector, for example, both of reverse surfaces of the current collector having a foil shape.

The current collector may include a portion that does not have the active material-containing layer formed on a surface thereof. This portion can serve as a current collecting tab.

A specific example of the electrode according to the embodiment is shown in FIG. 1. FIG. 1 is a cross-sectional view schematically showing an example of the electrode according to the embodiment. With the example shown in FIG. 1, an aspect of the electrode as a positive electrode of a battery will be described. FIG. 1 is a cross-sectional view representing a cross-section intersecting a principal surface of a positive electrode 5.

The positive electrode 5 shown in FIG. 1 includes a positive electrode current collector 5*a* and a positive electrode active material-containing layer 5*b* disposed on the positive electrode current collector 5*a*. The positive electrode current collector 5*a* includes a portion that does not support the positive electrode active material-containing layer 5*b* thereon, that is, a positive electrode current collecting tab 5*c*. In the example shown, the positive electrode active material-containing layer 5*b* is supported on both principal surfaces on the front and reverse surfaces of the positive electrode current collector 5*a*. The positive electrode 5 may be an electrode with the positive electrode active material-containing layer 5*b* supported only on one face of the positive electrode current collector 5*a*.

Figure 2:
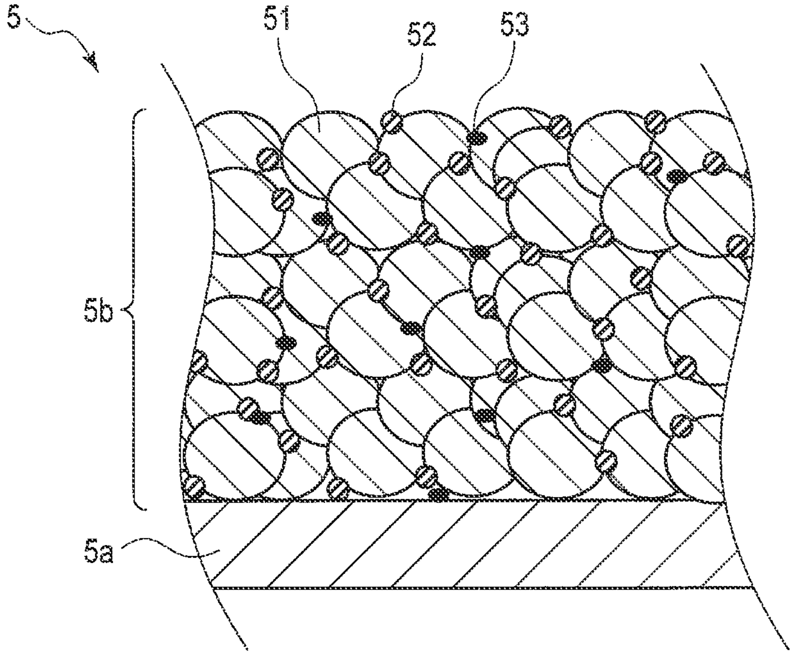
FIG. 2 is an enlarged cross-sectional view schematically showing the example of the electrode according to the embodiment.

FIG. 2 shows the electrode in more detail. FIG. 2 is an enlarged cross-sectional view schematically showing an example of the electrode according to the embodiment. In the example shown in FIG. 2, the aspect as a positive electrode will be described as in FIG. 1. Furthermore, FIG. 2 is a schematic cross-sectional view showing a part of a cross-section intersecting with the principal surface of the positive electrode 5, as in FIG. 1. However, FIG. 2 shows, unlike FIG. 1, an example in which the active material-containing layer is supported on only one surface of the current collector.

The positive electrode 5 shown in FIG. 2 includes a positive electrode current collector 5*a*, and a positive electrode active material-containing layer 5*b* provided on the positive electrode current collector 5*a*. In the example shown, the positive electrode active material-containing layer 5*b* is supported on one principal surface of the positive electrode current collector 5*a*. The positive electrode active material-containing layer 5*b* includes active material particles 51, inorganic solid particles 52, and particulate carbon material 53. As exemplified in FIG. 2, the inorganic solid particles 52 are dispersed and arranged as primary particles without being agglomerated within the positive electrode active material-containing layer 5*b*. By having the fine inorganic solid particles 52 being present within the positive electrode active material-containing layer 5*b* in a uniformly dispersed state in the form of primary particles, their large surface areas can be utilized effectively to promote lithium ion conductivity. Therefore, the electrode according to the embodiment has excellent input/output performance.

Figure 3:
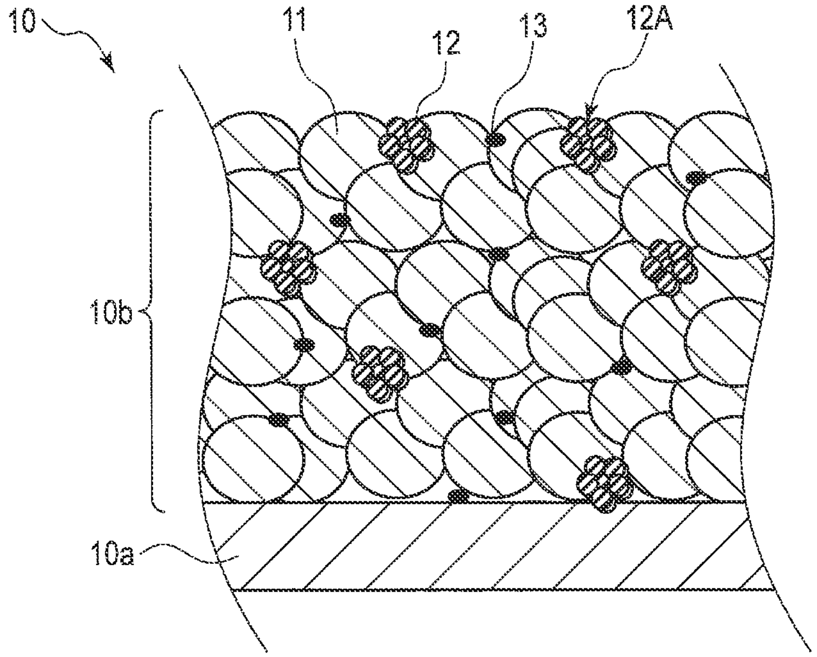
FIG. 3 is an enlarged cross-sectional view schematically showing an example of a conventional electrode.

For comparison, FIG. 3 shows an example of a conventional electrode. FIG. 3 is an enlarged cross-sectional view schematically showing an example of a conventional electrode. FIG. 3 is a schematic cross-sectional view showing a part of a cross-section intersecting with the principal surface of the electrode. The conventional electrode 10 shown in FIG. 3 includes a current collector 10*a*, and an active material-containing layer 10*b* provided on the current collector 10_a_. In the example illustrated, the active material-containing layer 10_b_ is supported on one principal surface of the current collector 10_a_. The active material-containing layer 10_b_ includes active material particles 11, inorganic solid particles 12, and particulate carbon materials 13. The inorganic solid particles 12 are included in the active material-containing layer 10_b_ as inorganic solid secondary particles 12A each of which are agglomerated inorganic solid particles 12. Among the surfaces of the inorganic solid particles 12, the surfaces facing toward the inside of the inorganic solid secondary particles 12A are not utilized efficiently, and even if fine inorganic solid particles 12 are added, the effect is equivalent to that obtained when inorganic solid particles having a large particle size are added.

Figure 4:
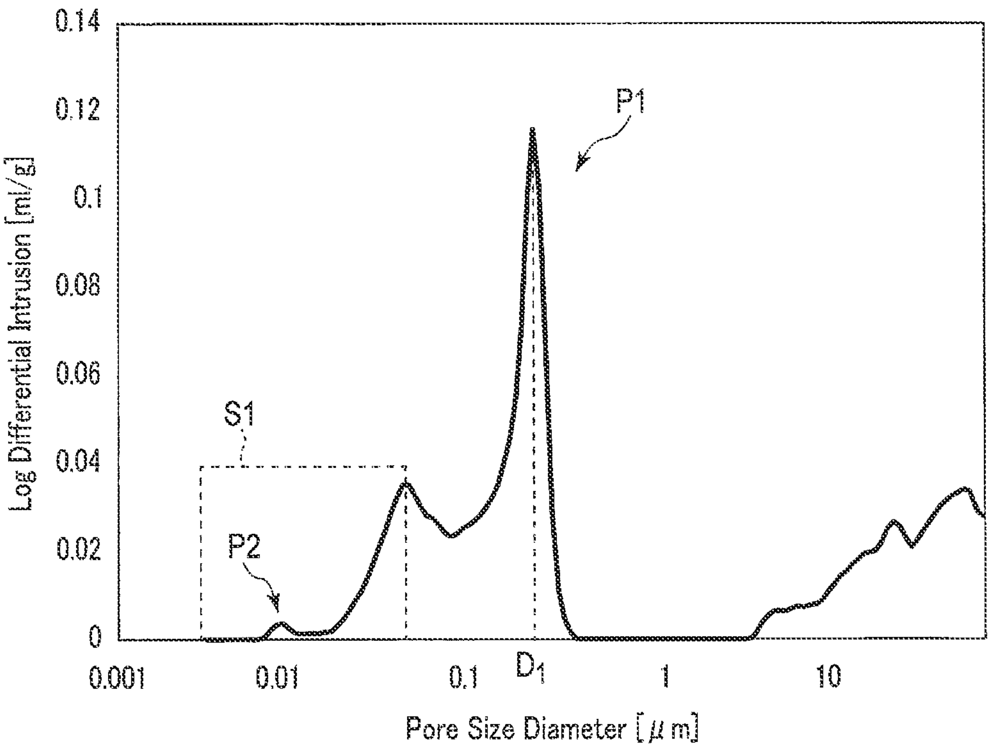
FIG. 4 is a graph showing a log differential intrusion distribution of an active material-containing layer of the example of the electrode according to the embodiment.
Figure 5:
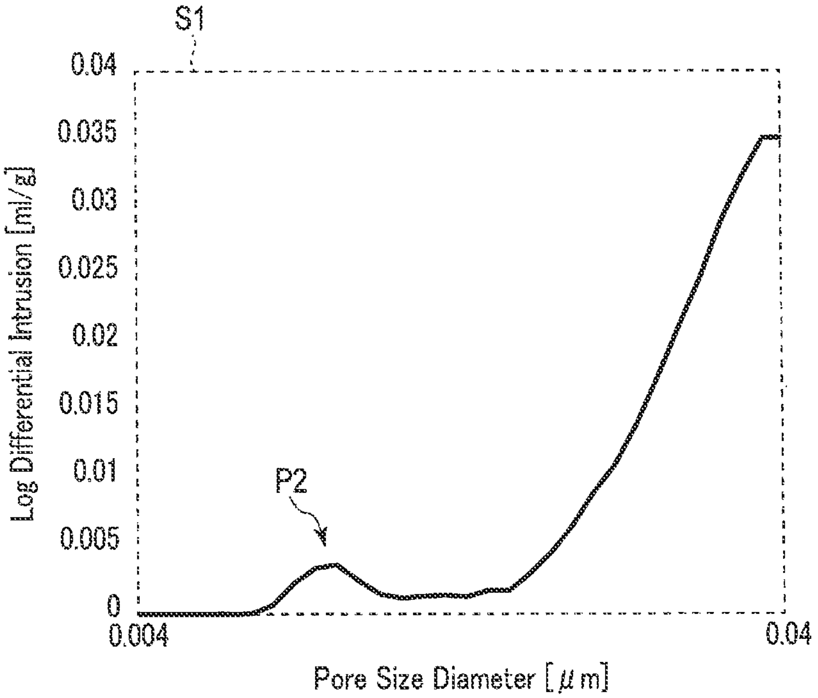
FIG. 5 is an enlarged graph of section S1 in FIG. 4.
Figure 6:
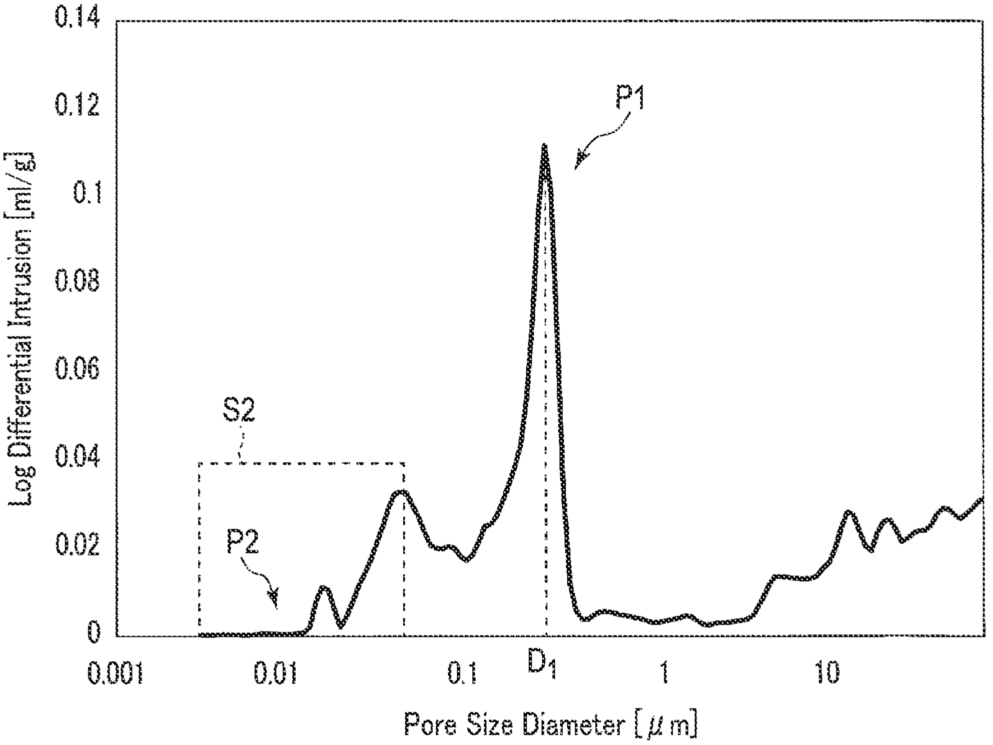
FIG. 6 is a graph showing a log differential intrusion distribution of an active material-containing layer of another example of the electrode according to the embodiment.
Figure 7:
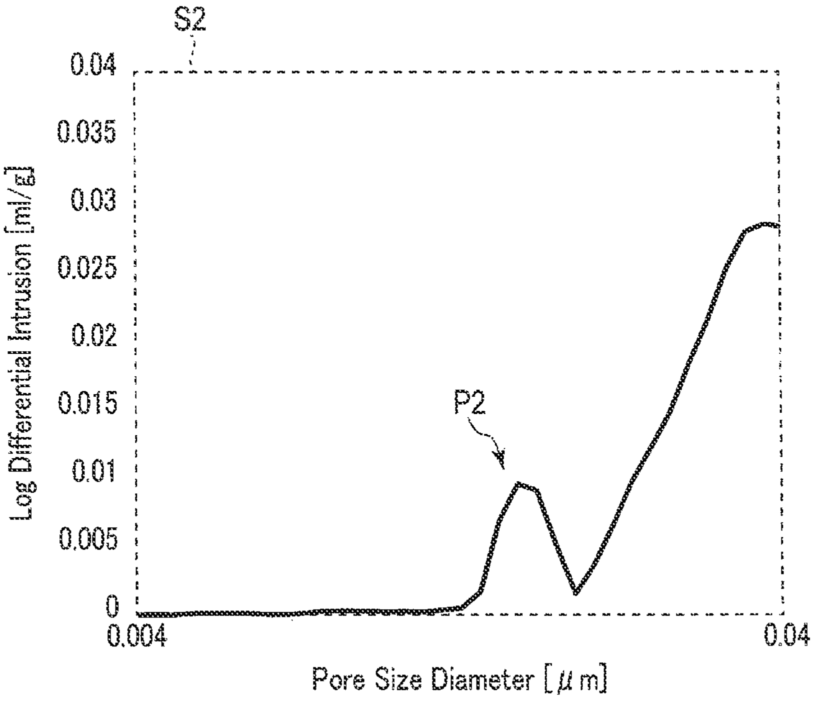
FIG. 7 is an enlarged graph of section S2 in FIG. 6.

Specific examples of the log differential intrusion distribution curve obtained by mercury porosimetry for the active material-containing layer included in the electrode according to the embodiment are shown. FIGS. 4 and 6 are graphs showing log differential intrusion distributions of active material-containing layers of an example and another example, respectively, of the electrode according to the embodiment. FIGS. 5 and 7 are enlarged graphs of section S1 in FIG. 4 and section S2 in FIG. 6, respectively.

The log differential intrusion distribution curves shown in FIGS. 4 and 6 each have a peak top positioned at the pore size diameter $D_1$ within a range of 0.05 μm to 10 μm (horizontal direction), and includes a first peak P1 corresponding to the maximum log differential intrusion (vertical direction) in the log differential intrusion curve. A first pore volume corresponding to the first peak P1, that is, a cumulative pore volume at the first peak P1, accounts for 20% to 50% of the total pore volume of the active material-containing layer according to mercury porosimetry shown in the graph. Note that a cumulative pore volume for pore size diameters (horizontal axis) within a certain range corresponds to a value obtained by integrating a log differential intrusion distribution (vertical axis) in that range, that is, an area beneath the log differential intrusion distribution curve within the corresponding width in the horizontal direction of the graph.

The first pore volume is not a cumulative pore volume within the range of 0.05 μm to 10 μm, but corresponds to a cumulative pore volume within a range between pore size diameters (horizontal axis) corresponding to the minimum values of the log differential intrusion (vertical axis) appearing before and after the peak top of the first peak P1. For instance, in the case of the example shown in FIG. 4, a cumulative pore volume within a pore size diameter range of 0.07 μm to 0.4 μm corresponds to the first pore volume, and in the case of the example shown in FIG. 6, a cumulative pore volume within a pore size diameter range of 0.09 μm to 0.4 μm corresponds to the first pore volume.

In the example shown, the log differential intrusion distribution curve includes a second peak P2 in a pore size diameter range of 0.005 μm to 0.02 μm (horizontal direction). The electrode according to the embodiment includes an aspect in which the log differential intrusion distribution curve of the active material-containing layer does not include the second peak P2 within the above range. For example, a shoulder of the first peak may be included in the pore size diameter range of 0.005 μm to 0.02 μm.

The cumulative pore volume within the pore size diameter range of 0.005 μm to 0.02 μm (second pore volume) takes a value of 0.1% to 5% in ratio with respect to the first pore volume of the first peak P1 (0.001≤second pore volume/first pore volume≤0.05).

In the first peak P1, the pores formed among the active material particles in the active material-containing layer are primarily reflected. In the pore size diameter range of 0.005 μm to 0.02 μm of the log differential intrusion distribution curve, the pores formed among the inorganic solid particles that are not excessively agglomerated are primarily reflected.

As in the example shown in FIGS. 4 and 5 and that in FIGS. 6 and 7, in the active material-containing layer in which the log differential intrusion distribution curve according to mercury porosimetry includes the most intense peak (first peak P1) in the above-described range, and the pore volume corresponding to the peak (first pore volume) and the pore volume in the pore size diameter range of 0.005 μm to 0.02 μm (second pore volume) meet the above-described conditions, the inorganic solid particles are dispersed evenly throughout the layer without being agglomerated. Thus, the electrode including such an active material-containing layer can exhibit excellent input/output performance. Furthermore, since a dispersion rate of lithium ion into the active material-containing layer has little variance, the entire active material-containing layer can participate in the charge-discharge reaction uniformly, whereby partial deterioration hardly occurs.

The total pore volume of the active material-containing layer according to mercury porosimetry is preferably 0.05 mL/g to 0.10 mL/g. An active material-containing layer having a total pore volume within this range has a high energy density and can hold a sufficient amount of electrolyte. The total pore volume is more preferably 0.06 mL/g to 0.08 mL/g.

Hereinafter, the electrode will be described in detail.

The active material-containing layer may contain one compound alone, or may contain two or more compounds in combination as the active material.

The active material-containing layer contains the active material in the form of particles, for example. The active material is desirably included in the active material-containing layer in the form of primary particles. The solid electrolyte particles are dispersed better with the active material in the form of primary particles than the active material forming secondary particles by agglomeration. The active material particles preferably have an average primary particle size of 1 μm to 20 μm.

The inorganic solid particles are mixed in so as to increase lithium ion conductivity in the active material-containing layer. The inorganic solid particles preferably include at least one compound selected from the group consisting of: a first metal oxide including at least one element selected from the group consisting of Ti, Ge, Sr, Zr, Sn, Al, Sc, Y, Ba, P, and Ca; a lanthanide oxide; and a first sulfide including at least one element selected from the group consisting of Li, Ge, P, Si, Sn, Al, Ga, B, and In. The lanthanide oxide is an oxide including a lanthanide element, such as La, Ce, Pr, Nd, or the like. The first metal oxide may further include a lanthanide element, such as La or the like.

Examples of inorganic solid electrolyte particles include an oxide-based solid electrolyte and a sulfide-based solid electrolyte. As the oxide-based solid electrolyte, a lithium phosphate solid electrolyte having a NASICON structure and represented by a general formula $LiMe_2(PO_4)_3$ is preferably used. Me in the above formula is preferably one or more selected from the group consisting of titanium (Ti), germanium (Ge), strontium (Sr), zirconium (Zr), tin (Sn), and aluminum (Al). The element Me preferably includes Al and one among Ge, Zr, and Ti.

Specific examples of the lithium phosphate solid electrolyte having the NASICON structure include LATP ($Li_{1+d+e}Al_dTi_{2-d}P_{3-e}O_{12}$ where 0<d≤2, 0≤e<3), $Li_{1+f+e}Al_fGe_{2-f}Si_eP_{3-e}O_{12}$ where 0≤f≤2, 0≤e<3, $Li_{1+f}Al_fZr_{2-f}(PO_4)_3$ where 0≤f≤2, and $Li_{1+2g}Ca_gZr_{1-g}(PO_4)_3$ where 0≤g<1. $Li_{1+2g}Ca_gZr_{1-g}(PO_4)_3$ is preferably used as inorganic solid electrolyte particles for having high water-resistance, low reducing ability, and low cost.

In addition to the above lithium phosphate solid electrolyte, examples of the oxide-based solid electrolyte include amorphous LIPON compounds represented by $Li_hPO_iN_j$ where 2.6≤h≤3.5, 1.9≤i≤3.8, and 0.1≤j≤1.3 (e.g., $Li_{2.9}PO_{3.3}N_{0.46}$); a compound having a garnet structure and represented by $La_{5+k}X_kLa_{3-k}M\alpha_2O_{12}$ where X is one or more selected from the group consisting of Ca, Sr and Ba, Mα is one or more selected from the group consisting of Nb and Ta, and 0≤k≤0.5; a compound represented by $Li_3M\beta_{2-k}L_2O_{12}$ where Mβ is one or more selected from the group consisting of Ta and Nb, L may include Zr, and 0≤k≤0.5; a compound represented by $Li_{7-3k}Al_kLa_3Zr_3O_{12}$ where 0≤k≤0.5; and a LLZ compound represented by $Li_{5+f}La_3M\gamma_{2-f}Zr_fO_{12}$ where Mγ is one or more selected from the group consisting of Nb and Ta, and 0≤f≤2 (e.g., $Li_7La_3Zr_2O_{12}$).

In addition, as the solid electrolyte, a sodium-containing solid electrolyte may be used. The sodium-containing solid electrolyte is excellent in ionic conductivity of sodium ions. Examples of the sodium-containing solid electrolyte include β-alumina, sodium phosphorus sulfides, sodium phosphates, and the like. The sodium ion-containing solid electrolyte is preferably in a form of glass ceramics.

The inorganic solid particles are preferably solid electrolyte having a lithium ion conductivity of $1\times10^{-5}$ S/cm or more at 25° C. The lithium ion conductivity can be measured by, for example, the alternating-current impedance method. To be more specific, first, the inorganic solid particles are molded by using a tablet making machine, whereby a pressed powder body is obtained. Gold (Au) is deposited onto both of reverse surfaces of this pressed powder body, to thereby obtain a measurement sample. The alternating-current impedance of the measurement sample is measured using an impedance measurement apparatus. As the measurement apparatus, Solartron model 1260 Frequency Response Analyzer may be used, for example. The measurement is performed over a measurement frequency range of 5 Hz to 32 MHz at a temperature of 25° C. under argon atmosphere.

Based on the measured alternating-current impedance, a complex impedance plot is prepared. The complex impedance plot involves plotting an imaginary component on a vertical axis and a real component on a horizontal axis. Ionic conductivity $\sigma_{Li}$ of the inorganic solid particles is calculated by the following equation. In the following equation, $Z_{Li}$ is a resistance calculated from a diameter of an arc of the complex impedance plot, S is an area, and d is a thickness.

$$\sigma_{Li}=(1/Z_{Li})\times(d/S)$$

The solid electrolyte is preferably a Lewis acid. Such a solid electrolyte easily becomes positively charged, and thus can capture anions within the electrolyte. This allows lithium ions, which are cations, to more easily migrate within the active material-containing layer. Examples of such solid electrolyte include $Li_{1+2g}Ca_gZr_{1-g}(PO_4)_3$ and LATP described above.

The shape of inorganic solid particles is not particularly limited but may be, for example, spherical, in elliptical shape, flat-shaped, fibrous, or the like.

The average primary particle size of the inorganic solid particles is preferably 2 μm or less. When the inorganic solid particles have a smaller average primary particle size, the battery tends to have lower internal resistance.

The average primary particle size of the inorganic solid particles is preferably 0.2 μm or more. When the inorganic solid particles have a large average primary particle size, aggregation of the particles tends to be suppressed.

The electrode includes a carbon material as an electro-conductive agent. The electro-conductive agent is added to improve current collecting performance and to suppress the contact resistance between the active material and the current collector. As the carbon material, at least carbon materials in the form of particles are desirably used. Examples of such particulate electro-conductive agents include carbon black such as acetylene black and graphite. One of these may be used as the electro-conductive agent, or two or more may be used in combination as the electro-conductive agent. As other electro-conductive agents, for example, fibrous carbon material or plate-shaped or flaky carbon materials may also be used. Examples of the fibrous carbon material include vapor grown carbon fiber (VGCF), carbon nanofiber, and carbon nanotube. Examples of the plate-shaped or flaky carbon materials include graphene. In addition to including the electro-conductive agent, a carbon coating or an electron-conductive inorganic material coating may also be applied to the surface of the active material particles.

In the active material-containing layer, the mixing amount of the carbon material is preferably 0.01 parts by mass to 10 parts by mass, and more preferably 0.1 parts by mass to 5 parts by mass, relative to 100 parts by mass of the active material. With a large amount of carbon material, electronic conductivity of the active material-containing layer can be made high. On the other hand, when the amount of carbon material is excessive, energy density may decrease.

The binder is added to fill gaps among the dispersed active material and also to bind the active material with the current collector. Examples of the binder include polytetrafluoroethylene (PTFE), polyvinylidene fluoride (PVdF), fluororubber, styrene-butadiene rubber, polyacrylate compounds, imide compounds, carboxymethyl cellulose (CMC), and salts of CMC. One of these may be used as the binder, or two or more may be used in combination as the binder.

In the active material-containing layer, the mixing amount of the binder is preferably 0 parts by mass to 10 parts by mass, and more preferably 1 part by mass to 5 parts by mass, relative to 100 parts by mass of the active material. With a large amount of binder, binding between the active material-containing layer and the current collector is sufficient, and thus, excellent cycle performance can be expected. On the other hand, when the amount of binder is excessive, energy density may decrease.

There may be used for the current collector, a material which is electrochemically stable at the potential at which lithium (Li) is inserted into and extracted from the active material. The current collector is preferably made of copper, nickel, stainless steel, aluminum, or an aluminum alloy including one or more selected from the group consisting of Mg, Ti, Zn, Mn, Fe, Cu, and Si. The thickness of the current collector is preferably from 5 μm to 20 μm. The current collector having such a thickness can maintain balance between the strength and weight reduction of the electrode.

The electrode according to the embodiment may either be used as a positive electrode, or be used as a negative electrode. The electrode according to the embodiment is preferably used a positive electrode.

Next, the aspect of the electrode according to the first embodiment as a negative electrode and the aspect thereof as a positive electrode will respectively be explained in detail.

(Positive Electrode)

The positive electrode may include a positive electrode current collector and a positive electrode active material-containing layer. The positive electrode active material-containing layer may be formed on one surface or both of reverse surfaces of the positive electrode current collector. The positive electrode active material-containing layer may include a positive electrode active material, inorganic solid particles, carbon material, and optionally other electro-conductive agents and a binder. The positive electrode current collector and the positive electrode active material-containing layer may respectively be the above-described current collector and active material-containing layer.

The positive electrode active material may include a lithium-containing transition metal composite oxide. The lithium-containing transition metal composite oxide preferably includes at least one transition metal selected from the group consisting of nickel, cobalt, and manganese. In addition to these transition metals, the lithium-containing transition metal composite oxide preferably further includes at least one element of either titanium or aluminum. The lithium-containing transition metal composite oxide may be represented by $Li_{1-v}Ni_{1-a-b}Co_aMn_bA_cO_2$. A is at least one element selected from the group consisting of Al, Ti, Zr, Nb, Mg, Cr, V, Fe, Ta, Mo, Zn, Ca, Sn, Si, and P, v is 0 to 1, a is 0 to 1, b is 0 to 1, the sum of a and b is 1 or less, and c is 0 to 1.

Examples of the lithium-containing transition metal composite oxide include lithium manganese composite oxides (e.g., $Li_xMn_2O_4$ or $Li_xMnO_2$; $0<x\leq 1$), lithium nickel composite oxides (e.g., $Li_xNiO_2$; $0<x\leq 1$), lithium cobalt composite oxides (e.g., $Li_xCoO_2$; $0<x\leq 1$), lithium nickel cobalt composite oxides (e.g., $Li_xNi_{1-y}Co_yO_2$; $0<x\leq 1$, $0<y<1$), lithium manganese cobalt composite oxides (e.g., $Li_xMn_yCo_{1-y}O_2$; $0<x\leq 1$, $0<y<1$), lithium manganese nickel composite oxides having a spinel structure (e.g., $Li_xMn_{2-w}Ni_wO_4$; $0<x\leq 1$, $0<w<2$), lithium phosphates having an olivine structure (e.g., $Li_xFePO_4$; $0<x\leq 1$, $Li_xFe_{1-y}Mn_yPO_4$; $0<x\leq 1$, $0<y<1$, and $Li_xCoPO_4$; $0<x\leq 1$), and lithium nickel cobalt manganese composite oxides ($Li_xNi_{1-y-z}Co_yMn_zO_2$; $0<x\leq 1$, $0<y<1$, $0<z<1$, $y+z<1$).

Alternatively, the positive electrode active material may include another oxide or sulfide. An example of the oxide and the sulfide is a compound capable of having Li or Li ions inserted into and extracted from. Other examples of the oxide include manganese dioxides ($MnO_2$), iron oxides, copper oxides, nickel oxides, and vanadium oxides (e.g., $V_2O_5$). Other examples of the sulfide include iron sulfate ($Fe_2(SO_4)_3$).

The specific surface area of the positive electrode active material is preferably from 0.1 $m^2/g$ to 10 $m^2/g$. The positive electrode active material having a specific surface area of 0.1 $m^2/g$ or more can secure sufficient sites for inserting and extracting Li ions. The positive electrode active material having a specific surface area of 10 $m^2/g$ or less is easy to handle during industrial production, and can secure a good charge-discharge cycle performance.

The positive electrode current collector is preferably an aluminum foil, or an aluminum alloy foil containing one or more element selected from the group consisting of Mg, Ti, Zn, Ni, Cr, Mn, Fe, Cu, and Si. Purity of the aluminum foil is preferably 99% by mass or more. The amount of transition metal such as iron, copper, nickel, or chromium contained in the aluminum foil or aluminum alloy foil is preferably 1% by mass or less.

The positive electrode current collector may include a portion where a positive electrode active material-containing layer is not formed on a surface of thereof. This portion may serve as a positive electrode current collecting tab.

The density of the positive electrode active material-containing layer (excludes the current collector) is preferably 3.0 $g/cm^3$ to 3.6 $g/cm^3$, and more preferably 3.2 $g/cm^3$ to 3.5 $g/cm^3$.

(Negative Electrode)

The negative electrode may include a negative electrode current collector and a negative electrode active material-containing layer. The negative electrode active material-containing layer may include a negative electrode active material, inorganic solid particles, carbon material, and optionally other electro-conductive agents and a binder. The negative electrode current collector and the negative electrode active material-containing layer may respectively be the above-described current collector and active material-containing layer.

Examples of the negative electrode active material include lithium titanate having a spinel structure (e.g., lithium titanate represented by $Li_{4+m}Ti_5O_{12}$, where $0\leq m\leq 3$), titanium dioxide ($TiO_2$), anatase titanium dioxide, rutile titanium dioxide, niobium pentoxide ($Nb_2O_5$), a hollandite titanium composite oxide, a lithium titanate having a ramsdellite structure (e.g., $Li_{2+m}Ti_3O_7$, $0\leq m\leq 3$), an orthorhombic titanium composite oxide, and a monoclinic niobium-titanium composite oxide.

Examples of the orthorhombic titanium-containing composite oxide include a compound represented by $Li_{2+n}M1_{2-r}Ti_{6-s}M2_tO_{14+\sigma}$. Here, M1 is at least one selected from the group consisting of Sr, Ba, Ca, Mg, Na, Cs, Rb and K. M2 is at least one selected from the group consisting of Zr, Sn, V, Nb, Ta, Mo, W, Y, Fe, Co, Cr, Mn, Ni and Al. The respective subscripts in the composition formula are specified as follows: $0\leq n\leq 6$, $0\leq r<2$, $0\leq s<6$, $0\leq t<6$, and $-0.5\leq\sigma\leq 0.5$. A specific example of the orthorhombic titanium-containing composite oxide is $Li_{2+n}Na_2Ti_6O_{14}$ ($0\leq n\leq 6$).

An example of the monoclinic niobium-titanium composite oxide includes a compound represented by $Li_uTi_{1-g}M3_gNb_{2-r}M4_rO_{7+\delta}$. Here, M3 is at least one selected from the group consisting of Zr, Si, and Sn. M4 is at least one selected from the group consisting of V, Ta, and Bi. The respective subscripts in the composition formula are specified as follows: $0\leq u\leq 5$, $0\leq g<1$, $0\leq r<2$, and $-0.3\leq\delta\leq 0.3$. A specific example of the monoclinic niobium-titanium composite oxide is $Li_uNb_2TiO_7$ ($0\leq u\leq 5$).

Another example of the monoclinic niobium-titanium composite oxide is a compound represented by $Li_uTi_{1-g}M5_{g+r}Nb_{2-r}O_{7-\delta}$. Here, M5 is at least one selected from the group consisting of Mg, Fe, Ni, Co, W, Ta, and Mo. The respective subscripts in the composition formula are specified as follows: $0\leq u\leq 5$, $0\leq g<1$, $0\leq r<2$, and $-0.3\leq\delta\leq 0.3$.

The negative electrode current collector is preferably made of, for example, copper, nickel, stainless steel, aluminum, or an aluminum alloy including one or more selected from the group consisting of Mg, Ti, Zn, Mn, Fe, Cu, and Si.

The negative electrode current collector may include a portion where a negative electrode active material-containing layer is not formed on a surface of thereof. This portion may serve as a negative electrode current collecting tab.

The density of the negative electrode active material-containing layer (excludes the current collector) is preferably from 1.8 g/cm$^3$ to 2.8 g/cm$^3$. The negative electrode, in which the density of the negative electrode active material-containing layer is within this range, is excellent in energy density and ability to hold the electrolyte. The density of the negative electrode active material-containing layer is more preferably from 2.1 g/cm$^3$ to 2.6 g/cm$^3$.

<Production Method>

Next, a method of producing the electrode according to the embodiment will be described.

First, the inorganic solid particles are dispersed in a solvent, and the dispersion is subjected to a stirring treatment to thereby prepare a first slurry. As the solvent, for example, N-methyl-2-pyrrolidone is used. The solid content in the dispersion is adjusted to 10% to 70%. As a stirrer, a bead mill is used. Specific examples of the bead milling stirrer include, for example, STARMILL LME4, a bead mill manufactured by Ashizawa Finetech Ltd. The stirring treatment is performed under the conditions of bead diameter of (O 0.1 mm to 5 mm, bead filling rate of 40% to 90%, and stirring rate of 300 rpm to 2000 rpm for 1 minute to 1 hour. The stirring treatment is more preferably performed at a stirring rate of 700 rpm to 1500 rpm.

Next, the first slurry, active material, granular carbon (particulate carbon), and optionally binder and other carbon materials are mixed and stirred to prepare a second slurry. Here, a two-stage stirring treatment is performed, in which stirring is performed using a planetary mixer, and thereafter, further stirring is performed by bead milling. For the first-stage stirring by the planetary mixer, the stirring rate is, for example, 30 rpm to 6000 rpm, and the stirring time is 10 minutes to 2 hours. The second-stage stirring by bead milling is performed under the conditions of bead diameter of (0.5 mm to 3 mm, bead filling rate of 40% to 90%, and stirring rate of 300 rpm to 2000 rpm for 3 minutes to 1 hour.

The second slurry is applied onto one surface or both of reverse surfaces of the current collector, and the applied coat is dried, for example, under a temperature environment of 100° C. to 120° C. to obtain a stack of the active material-containing layer and the current collector. The stack is subjected to a press treatment, whereby an electrode can be obtained. According to this method, agglomeration of the inorganic solid particles is suppressed, and thus, the inorganic solid particles are dispersed sufficiently between the active materials. Thereby, inorganic solid particles having a large specific surface area can be arranged dispersed within the active material-containing layer, whereby an electrode having excellent output performance can be obtained.

<Measurement Methods>

Measuring methods concerning the electrode are described below. Specifically, a method of obtaining the log differential intrusion distribution curve of the active material-containing layer by mercury porosimetry and a method of examining the active material included in the electrode will be explained.

When measuring an electrode that is configured into a battery, the electrode is taken out of the battery by the following procedure.

First, the battery is put into a discharged state. The discharged state as described herein refers to a state where the battery is discharged until the degree of charge of the battery is 0%. The battery put into the discharged state is placed into a glove box of inert atmosphere, for example, a glove box filled with argon gas. Next, within the glove box, the target electrode is taken out from the battery. Specifically, within the glove box, the exterior of the battery is cut open, taking care not to short-circuit the positive electrode with the negative electrode, just in case. From the cut-open battery, for example, the electrode connected to the positive electrode-side terminal is cut out, in the case that the electrode used as positive electrode is to be made the measurement sample. Alternatively, the electrode connected to the negative electrode-side terminal is cut out, in the case that the electrode used as negative electrode is to be made the measurement sample. The electrode thus taken out is immersed, for example, in an ethyl methyl ether solution for 3 minutes, and then dried inside a glove box of inert gas atmosphere.

(Method of Obtaining Log Differential Intrusion Distribution Curve)

The log differential intrusion distribution curve of the active material-containing layer according to mercury porosimetry may be obtained, for example, by the following method.

The electrode as measurement sample is cut into plural test fragments. The size of the test fragments is, for example, that of a rectangular sheet having a shorthand side of 1.25 cm and longhand side of 2.5 cm. Note here, that the cutting for obtaining the test fragments is performed at positions including the center of an imaginary line parallel to the shorthand side of the electrode. In such a case that the electrode is obtained from a wound electrode group, further cutting is performed at positions that divide an imaginary line parallel to the longhand side of the electrode equivalently by the number of test fragments to be obtained. In such a case electrodes are obtained from a stacked electrode group, a test fragment is obtained from each one of the stacked electrode by further cutting the electrode at the center portion of an imaginary line parallel to the longhand side of the electrode. If the number of electrodes is less than the number of intended test fragments, a plural number of test fragments may be cut out from one electrode.

Next, the test fragments are placed in a measurement cell of a measurement device, and mercury is forced to intrude into the pores of the sample pieces. The number of the test fragments is, for example, 16 to 32. As the measurement cell, a large volume 5 cc cell having a stem volume of 0.4 cc is used, for example. As the measurement device, Autopore 9520 model manufactured by Shimadzu Corporation is used, for example. The measurement is conducted, for example, taking 7 kPa as an initial pressure and 414 MPa as an end pressure. The measurement is conducted at every pressure $1.1^n$ times the initial pressure, where n is a positive integer. Namely, the measurement is conducted at measurement points of, for example, 7 kPa, 7.7 kPa, 8.47 kPa, 9.317 kPa, . . . , $7\times1.1^n$ kPa until the pressure reaches 414 MPa. 7 kPa corresponds to 1.0 psia (pound per square inch absolute) and corresponds to a pore having a diameter of about 180 μm. 414 MPa corresponds to about 6 psia and corresponds to a pore having a diameter of about 0.003 μm. The mercury contact angle is 130 degrees, and the mercury surface tension is 485 dynes/cm. By processing the data obtained, a log differential intrusion (log differential pore volume) distribution curve, a total pore volume, and pore volumes for each range of pore diameters can be obtained for the active material-containing layer.

(Method of Examining Active Material and Inorganic Solid Particles)

The compositions of active material and inorganic solid particles included in the active material-containing layer of the electrode can be examined by combining elemental analysis with a scanning electron microscope equipped with an energy dispersive X-ray spectrometry scanning apparatus (scanning electron microscope-energy dispersive X-ray spectrometry; SEM-EDX), X-ray diffraction (XRD) measurement, and inductively coupled plasma (ICP) emission spectrometry. By SEM-EDX analysis, shapes of components contained in the active material-containing layer and compositions of the components contained in the active material-containing layer (each element from B to U in the periodic table) can be known. The elements in the active material-containing layer can be quantified by ICP. Crystal structures of materials included in the active material-containing layer can be examined by XRD measurement.

A cross-section of the electrode extracted as described above is cut out by Ar ion milling. The cutout cross-section is observed with the SEM. Sampling is also performed in an inert atmosphere such as argon or nitrogen, avoiding exposure to the air. Several particles are selected from SEM images at 3000-fold magnification. Here, particles are selected such that a particle diameter distribution of the selected particles becomes as wide as possible.

Next, elemental analysis is performed on each selected particle by EDX. Accordingly, it is possible to specify species and quantities of elements other than Li among the elements contained in each selected particle.

With regard to Li, information regarding the Li content in the entire active material-containing layer can be obtained by ICP emission spectrometry. ICP emission spectrometry is performed according to the following procedure.

From the dried electrode, a powder sample is prepared in the following manner. The active material-containing layer is dislodged from the current collector and ground in a mortar. The ground sample is dissolved with acid to prepare a liquid sample. Here, hydrochloric acid, nitric acid, sulfuric acid, hydrogen fluoride, and the like may be used as the acid. The concentration of elements included in the active material and inorganic solid particles being measured can be found by subjecting the liquid sample to ICP emission spectroscopic analysis.

Crystal structures of compounds included in each of the particles selected by SEM can be specified by XRD measurement. By determining the crystal structures, composite oxides and electrode active materials can be distinguished. XRD measurement is performed within a measurement range where 2θ is from 5 degrees to 90 degrees, using CuKα ray as a radiation source. By this measurement, X-ray diffraction patterns of compounds contained in the selected particles can be obtained.

As an apparatus for XRD measurement, SmartLab manufactured by Rigaku is used. Measurement is performed under the following conditions:

X ray source: Cu target
Output: 45 kV, 200 mA
soller slit: 5 degrees in both incident light and received light
step width (2θ): 0.02 deg
scan rate: 20 deg/min
semiconductor detector: D/teX Ultra 250
sample plate holder: flat glass sample plate holder (0.5 mm thick)
measurement range: range of $5° \leq 2\theta \leq 90°$ When another apparatus is used, measurement using a standard Si powder for powder X-ray diffraction is performed, conditions where measurement results of peak intensity, half-width and diffraction angles equivalent to results obtained by the above apparatus are sought, and measurement of the sample is conducted at those conditions.

Conditions of the XRD measurement is set, such that an XRD pattern applicable to Rietveld analysis is obtained. In order to collect data for Rietveld analysis, specifically, the step width is made ⅓ to ⅕ of the minimum half width of the diffraction peaks, and the measurement time or X-ray intensity is appropriately adjusted in such a manner that the intensity at the peak position of strongest reflected intensity is 5,000 cps or more.

The XRD pattern obtained as described above is analyzed by the Rietveld method. In the Rietveld method, the diffraction pattern is calculated from the crystal structure model that has been estimated in advance. Here, estimation of the crystal structure model is performed based on analysis results of EDX and ICP. The parameters of the crystal structure (lattice constant, atomic coordinate, occupancy ratio, or the like) can be precisely analyzed by fitting all the calculated values with the measured values.

XRD measurement can be performed with the electrode sample directly attached onto a glass holder of a wide-angle X-ray diffraction apparatus. At this time, an XRD spectrum is measured in advance in accordance with the species of metal foil of the electrode current collector, and the position(s) of appearance of the peak(s) derived from the collector is grasped. In addition, the presence/absence of peak (s) of mixed substances such as an electro-conductive agent or a binder is also grasped in advance. If the peak (s) of the current collector overlaps the peak (s) of the active material, it is desirable to perform measurement with the active material-containing layer removed from the current collector. This is in order to separate the overlapping peaks when quantitatively measuring the peak intensities. If the overlapping peaks can be grasped beforehand, the above operations can be omitted, of course.

(Method of Measuring Particle Size)

The average primary particle size of the primary particles of the active material and average primary particle size of inorganic solid particles can be obtained by TEM (Transmission Electron Microscope) observation.

The electrode as measurement sample is photographed using the TEM at a magnification with which primary particles of the active material and inorganic solid particles can be clearly seen, for example, 50,000 times magnification. For the active material and inorganic solid particle, respectively, an entirely visible primary particle is selected from the primary particles included in the TEM image. Next, the primary particle is approximated to an ellipse. In this approximation, the ratio of the long axis to the short axis of the ellipse is set such that the difference between the outline of the primary particle and the outline of the circumference of the ellipse is minimized. Next, the lengths of the long axis and the short axis of the ellipse are measured. The arithmetic mean value of the lengths of the long axis and the short axis of the thus obtained ellipse is defined as the particle size of the primary particle. The same operation as described above is performed for 100 arbitrarily selected particles, and an arithmetic mean value of the 100 particles is defined as the average particle size of the primary particles.

The electrode according to the first embodiment includes an active material-containing layer including an active material, inorganic solid particles having lithium ion conductivity, and a carbon material. A log differential intrusion distribution curve according to mercury porosimetry for the active material-containing layer includes a first peak having a peak top positioned at a pore size diameter $D_1$ within a range of 0.05 μm to 10 μm and exhibiting maximum log differential intrusion. A proportion of a first pore volume of the first peak relative to a total pore volume is 20% to 50%. A ratio of a second pore volume within a range of 0.005 μm to 0.02 μm relative to the first pore volume is 0.1% to 5%. The electrode exhibits excellent input/output performance.

Second Embodiment

According to a second embodiment, there is provided a secondary battery including a positive electrode, a negative electrode, and an electrolyte. At least one of the positive electrode and the negative electrode includes the electrode according to the first embodiment.

The secondary battery according to the second embodiment may further include a separator provided between the positive electrode and the negative electrode. The positive electrode, negative electrode, and separator may configure an electrode group. The electrolyte may be held in the electrode group.

The secondary battery according to the second embodiment may further include a container member that houses the electrode group and the electrolyte.

Moreover, the secondary battery according to the second embodiment may further include a positive electrode terminal electrically connected to the positive electrode and a negative electrode terminal electrically connected to the negative electrode.

The secondary battery according to the second embodiment may be, for example, a lithium secondary battery. The secondary battery also includes nonaqueous electrolyte secondary batteries containing nonaqueous electrolyte(s).

Hereinafter, the positive electrode, the negative electrode, the electrolyte, the separator, the container member, the positive electrode terminal, and the negative electrode terminal will be described.

1) Positive Electrode

The positive electrode may be an aspect as a positive electrode of the electrode according to the first embodiment. Alternatively, in a battery including the electrode according to the first embodiment as a negative electrode, the positive electrode may be another positive electrode different from the electrode according to the first embodiment.

The other positive electrode may be one that does not include solid electrolyte particles in the active material-containing layer (positive electrode active material-containing layer). In a log differential intrusion distribution curve measured by mercury porosimetry for the active material-containing layer of the other electrode, a peak top position of the most intense peak may be outside the range of 0.05 μm to 10 μm. Alternatively, even if the position of the most intense peak is within the range of 0.05 μm to 10 μm, a proportion of the pore volume corresponding to the peak (first pore volume) may be less than 20% or exceed 50% of the whole. Otherwise, a ratio of the pore volume within the range of 0.005 μm to 0.2 μm (second pore volume) to the pore volume of the most intense peak (first pore volume) may be less than 0.1% or exceed 5%. Other than the above, the details of the other positive electrode are the same as the electrode according to the first embodiment.

As description will overlap with that in the first embodiment, detailed description will be omitted.

2) Negative Electrode

The negative electrode may be an aspect as a negative electrode of the electrode according to the first embodiment. Alternatively, in a battery including the electrode according to the first embodiment as a positive electrode, the negative electrode may be another negative electrode different from the electrode according to the first embodiment.

The other negative electrode may be one that does not include solid electrolyte particles in the active material-containing layer (negative electrode active material-containing layer). In a log differential intrusion distribution curve measured by mercury porosimetry for the active material-containing layer of the other negative electrode, a peak top position of the most intense peak may be outside the range of 0.05 μm to 10 μm. Alternatively, even if the position of the most intense peak is within the range of 0.05 μm to 10 μm, a proportion of the pore volume corresponding to the peak (first pore volume) may be less than 20% or exceed 50% of the total. Otherwise, a ratio of the pore volume within the range of 0.005 μm to 0.2 μm (second pore volume) to the pore volume of the strongest peak (first pore volume) may be less than 0.1% or exceed 5%. Other than the above, the details of the other negative electrode are the same as the electrode according to the first embodiment.

As description will overlap with that in the first embodiment, detailed description will be omitted.

3) Electrolyte

As the electrolyte, for example, a liquid nonaqueous electrolyte or gel nonaqueous electrolyte may be used. The liquid nonaqueous electrolyte is prepared by dissolving an electrolyte salt as solute in an organic solvent. The concentration of electrolyte salt is preferably from 0.5 mol/L to 2.5 mol/L.

Examples of the electrolyte salt include lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$), and lithium bistrifluoromethylsulfonylimide ($LiN(CF_3SO_2)_2$), and mixtures thereof. The electrolyte salt is preferably resistant to oxidation even at a high potential, and most preferably $LiPF_6$.

Examples of the organic solvent include cyclic carbonates such as propylene carbonate (PC), ethylene carbonate (EC), and vinylene carbonate (VC); linear carbonates such as diethyl carbonate (DEC), dimethyl carbonate (DMC), and methyl ethyl carbonate (MEC); cyclic ethers such as tetrahydrofuran (THF), 2-methyl tetrahydrofuran (2-MeTHF), and dioxolane (DOX); linear ethers such as dimethoxy ethane (DME) and diethoxy ethane (DEE); γ-butyrolactone (GBL), acetonitrile (AN), and sulfolane (SL). These organic solvents may be used singularly or as a mixed solvent.

The gel nonaqueous electrolyte is prepared by obtaining a composite of a liquid nonaqueous electrolyte and a polymeric material. Examples of the polymeric material include polyvinylidene fluoride (PVdF), polyacrylonitrile (PAN), polyethylene oxide (PEO), and mixtures thereof.

Alternatively, other than the liquid nonaqueous electrolyte and gel nonaqueous electrolyte, a room temperature molten salt (ionic melt) including lithium ions, a polymer solid electrolyte, an inorganic solid electrolyte, or the like may be used as the nonaqueous electrolyte.

The room temperature molten salt (ionic melt) indicates compounds among organic salts made of combinations of organic cations and anions, which are able to exist in a liquid state at room temperature (15° C. to 25° C.). The room temperature molten salt includes a room temperature molten salt which exists alone as a liquid, a room temperature molten salt which becomes a liquid upon mixing with an electrolyte salt, a room temperature molten salt which becomes a liquid when dissolved in an organic solvent, and mixtures thereof. In general, the melting point of the room temperature molten salt used in secondary batteries is 25° C. or below. The organic cations generally have a quaternary ammonium framework.

The polymer solid electrolyte is prepared by dissolving the electrolyte salt in a polymeric material, and solidifying it.

The inorganic solid electrolyte is a solid substance having Li ion conductivity.

4) Separator

The separator may be made of, for example, a porous film or synthetic resin nonwoven fabric including polyethylene (PE), polypropylene (PP), polyethylene terephthalate (PET), cellulose, or polyvinylidene fluoride (PVdF). Other than that, there may be used separators where inorganic compounds or organic compounds are applied onto a porous film. In view of safety, a porous film made of polyethylene or polypropylene is preferred. This is because such a porous film melts at a fixed temperature and thus able to shut off current.

5) Container Member

As the container member, for example, a container made of laminate film or a container made of metal may be used.

The thickness of the laminate film is, for example, 0.5 mm or less, and preferably 0.2 mm or less.

As the laminate film, used is a multilayer film including multiple resin layers and a metal layer sandwiched between the resin layers. The resin layer may include, for example, a polymeric material such as polypropylene (PP), polyethylene (PE), nylon, or polyethylene terephthalate (PET). The metal layer is preferably made of aluminum foil or an aluminum alloy foil, so as to reduce weight. The laminate film may be formed into the shape of a container member, by heat-sealing.

The wall thickness of the metal container is, for example, 1 mm or less, more preferably 0.5 mm or less, and still more preferably 0.2 mm or less.

The metal container is made, for example, of aluminum or an aluminum alloy. The aluminum alloy preferably contains elements such as magnesium, zinc, or silicon. If the aluminum alloy contains a transition metal such as iron, copper, nickel, or chromium, the content thereof is preferably 100 ppm by mass or less. In a battery including such a metal container, drastic improvements in long-term reliability under high temperature environments and heat releasing properties become possible.

The shape of the container member is not particularly limited. The shape of the container member may be, for example, flat (thin), prismatic, cylindrical, coin-shaped, button-shaped, sheet-shaped, and stack-shaped. The container member may be appropriately selected depending on battery size and use of the battery. For example, the container member may be a container member for small-sized batteries to be installed on mobile electronic devices and the like. The container member may be a container member for large-scale batteries to be installed on vehicles, such as two- to four-wheeled automobiles.

6) Positive Electrode Terminal

The positive electrode terminal may be made of, for example, a material that is electrically stable in the potential range of 3 V to 4.5 V (vs. $Li/Li^+$) relative to the redox potential of lithium, and having electrical conductivity. Examples of the material for the positive electrode terminal include aluminum and an aluminum alloy containing one or more selected from the group consisting of Mg, Ti, Zn, Mn, Fe, Cu, and Si. The positive electrode terminal is preferably made of the same material as the positive electrode current collector, in order to reduce contact resistance between the positive electrode terminal and the positive electrode current collector.

7) Negative Electrode Terminal

The negative electrode terminal may be made of a material that is electrically stable within a potential range of 0.8 V to 3 V (vs. $Li/Li^+$) relative to a redox potential of lithium, and having electrical conductivity. Specific examples of the material for the negative electrode terminal include copper, nickel, stainless steel, aluminum, and aluminum alloy containing at least one selected from the group consisting of Mg, Ti, Zn, Mn, Fe, Cu, and Si. Aluminum or aluminum alloy is preferred as the material for the negative electrode terminal. The negative electrode terminal is preferably made of the same material as the negative electrode current collector, in order to reduce contact resistance between the negative electrode terminal and the negative electrode current collector.

Next, the secondary battery according to the second embodiment will be more concretely described with reference to the drawings.

Figure 8:
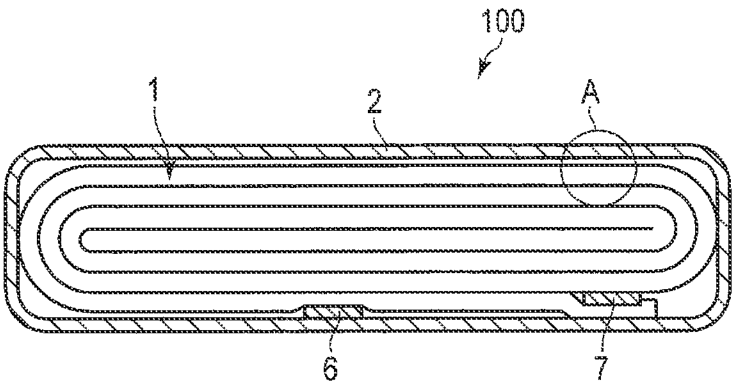
FIG. 8 is a cross-sectional view schematically showing an example of a secondary battery according to an embodiment.
Figure 9:
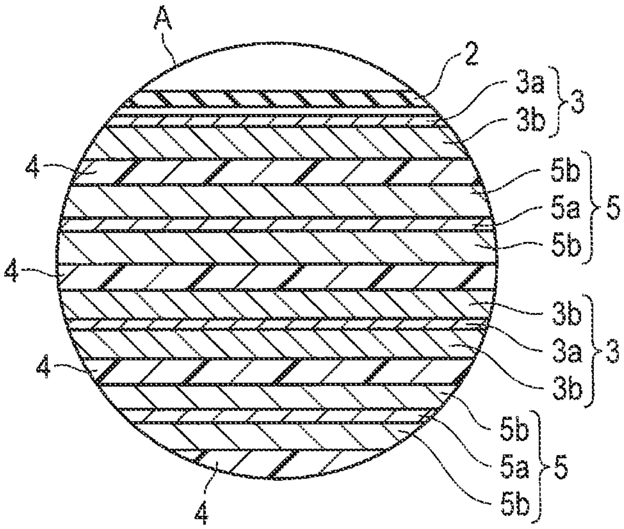
FIG. 9 is an enlarged cross-sectional view of section A of the secondary battery shown in FIG. 8.

FIG. 8 is a cross-sectional view schematically showing an example of a secondary battery according to the second embodiment. FIG. 9 is an enlarged cross-sectional view of section A of the secondary battery shown in FIG. 8.

The secondary battery 100 shown in FIGS. 8 and 9 includes a bag-shaped container member 2 shown in FIG. 8, an electrode group 1 shown in FIGS. 8 and 9, and an electrolyte, which is not shown. The electrode group 1 and the electrolyte are housed in the bag-shaped container member 2. The electrolyte (not shown) is held in the electrode group 1.

The bag-shaped container member 2 is made of a laminate film including two resin layers and a metal layer sandwiched between the resin layers.

As shown in FIG. 8, the electrode group 1 is a wound electrode group in a flat form. The wound electrode group 1 in a flat form includes a negative electrode 3, a separator 4, and a positive electrode 5, as shown in FIG. 9. The separator 4 is sandwiched between the negative electrode 3 and the positive electrode 5.

The negative electrode 3 includes a negative electrode current collector 3*a* and a negative electrode active material-containing layer 3*b*. At the portion of the negative electrode 3 positioned outermost among the wound electrode group 1, the negative electrode active material-containing layer 3*b* is formed only on an inner surface of the negative electrode current collector 3*a*, as shown in FIG. 9. For the other portions of the negative electrode 3, negative electrode active material-containing layers 3*b* are formed on both of reverse surfaces of the negative electrode current collector 3*a*.

The positive electrode 5 includes a positive electrode current collector 5*a* and positive electrode active material-containing layers 5*b* formed on both of reverse surfaces of the positive electrode current collector 5*a*.

As shown in FIG. 8, a negative electrode terminal 6 and positive electrode terminal 7 are positioned in vicinity of the outer peripheral edge of the wound electrode group 1. The negative electrode terminal 6 is connected to a portion of the negative electrode current collector 3*a* positioned outermost. The positive electrode terminal 7 is connected to a portion of the positive electrode current collector sa positioned outermost. The negative electrode terminal 6 and the positive electrode terminal 7 extend out from an opening of the bag-shaped container member 2. A thermoplastic resin layer is provided on the inner surface of the bag-shaped container member 2, and the opening is sealed by heat-sealing the resin layer.

Figure 10:
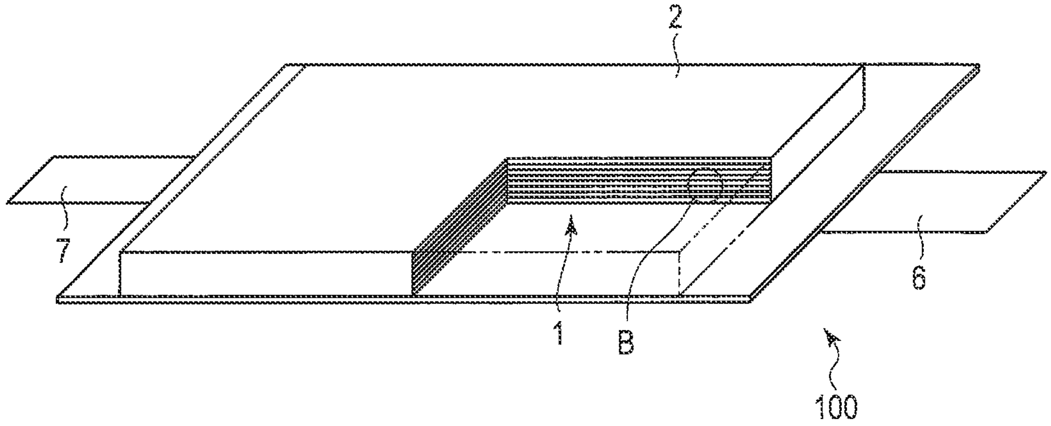
FIG. 10 is a partially cut-out perspective view schematically showing another example of the secondary battery according to an embodiment.
Figure 11:
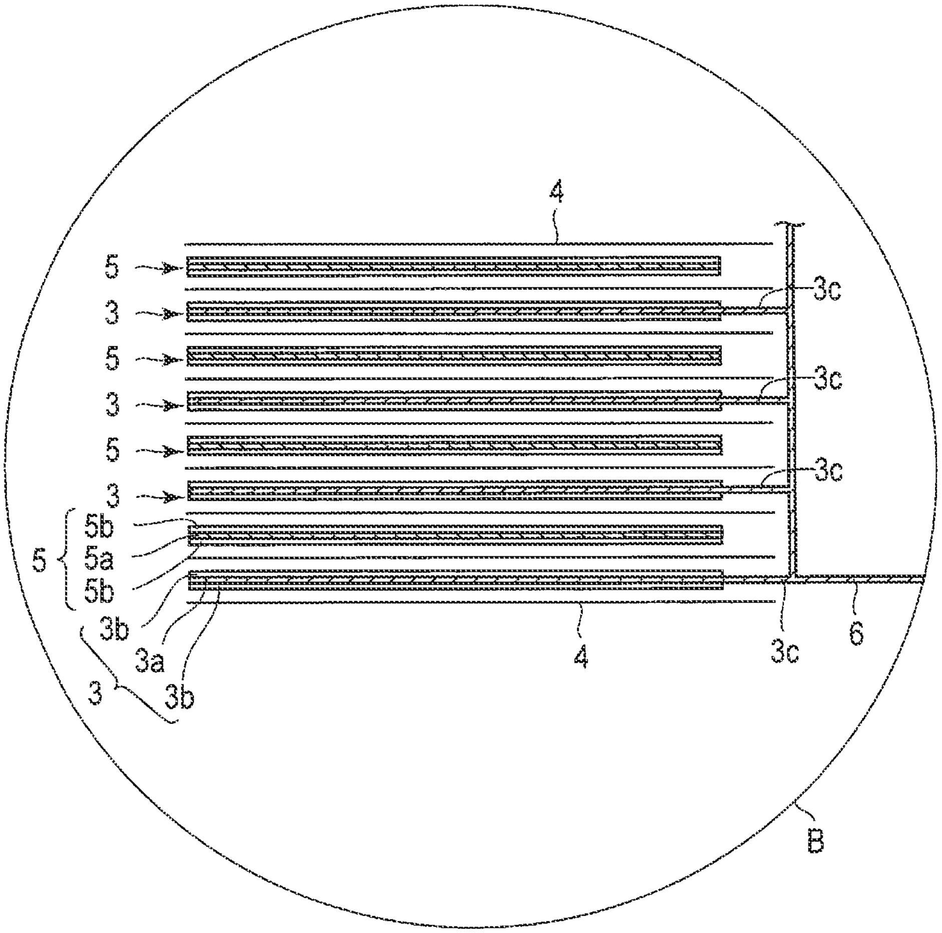
FIG. 11 is an enlarged cross-sectional view of section B of the secondary battery shown in FIG. 10.

The secondary battery according to the second embodiment is not limited to the secondary battery of the structure shown in FIGS. 8 and 9, and may be, for example, a battery of a structure as shown in FIGS. 10 and 11.

FIG. 10 is a partially cut-out perspective view schematically showing another example of the secondary battery according to the second embodiment. FIG. 11 is an enlarged cross-sectional view of section B of the secondary battery shown in FIG. 10.

The secondary battery 100 shown in FIGS. 10 and 11 includes an electrode group 1 shown in FIGS. 10 and 11, a container member 2 shown in FIG. 10, and an electrolyte, which is not shown. The electrode group 1 and electrolyte are housed in the container member 2. The electrolyte is held in the electrode group 1.

The container member 2 is made of a laminate film including two resin layers and a metal layer sandwiched between the resin layers.

As shown in FIG. 11, the electrode group 1 is a stacked electrode group. The stacked electrode group 1 has a structure in which negative electrodes 3 and positive electrodes 5 are alternately stacked with separator(s) 4 sandwiched therebetween.

The electrode group 1 includes plural negative electrodes 3. Each of the negative electrodes 3 includes the negative electrode current collector 3*a* and the negative electrode active material-containing layers 3*b* supported on both surfaces of the negative electrode current collector 3*a*. The electrode group 1 further includes plural positive electrodes 5. Each of the positive electrodes 5 includes the positive electrode current collector 5*a* and the positive electrode active material-containing layers 5*b* supported on both surfaces of the positive electrode current collector 5*a*.

The negative electrode current collector 3*a* of each of the negative electrodes 3 includes at one end, a portion where the negative electrode active material-containing layer 3*b* is not supported on either surface. This portion serves as a negative electrode current collecting tab 3*c*. As shown in FIG. 11, the negative electrode current collecting tabs 3*c* do not overlap the positive electrodes 5. The plural negative electrode current collecting tabs 3*c* are electrically connected to the strip-shaped negative electrode terminal 6. A tip of the strip-shaped negative electrode terminal 6 is drawn to the outside from the container member 2.

Although not shown, the positive electrode current collector 5*a* of each of the positive electrodes 5 includes at one end, a portion where the positive electrode active material-containing layer 5*b* is not supported on either surface. This portion serves as a positive electrode current collecting tab. Like the negative electrode current collecting tabs 3*c*, the positive electrode current collecting tabs do not overlap the negative electrodes 3. Further, the positive electrode current collecting tabs are located on the opposite side of the electrode group 1 with respect to the negative electrode current collecting tabs 3*c*. The positive electrode current collecting tabs are electrically connected to the strip-shaped positive electrode terminal 7. A tip of the strip-shaped positive electrode terminal 7 is located on the opposite side relative to the negative electrode terminal 6 and drawn to the outside from the container member 2.

The secondary battery according to the second embodiment includes the electrode according to the first embodiment as at least one of the positive electrode and the negative electrode. Thus, the secondary battery according to the second embodiment is excellent in input/output performance.

Third Embodiment

According to a third embodiment, a battery module is provided. The battery module according to the third embodiment includes plural of secondary batteries according to the second embodiment.

In the battery module according to the third embodiment, each of the single-batteries may be arranged to be electrically connected in series or in parallel, or may be arranged in combination of in-series connection and in-parallel connection.

An example of the battery module according to the third embodiment will be described next, with reference to the drawings.

Figure 12:
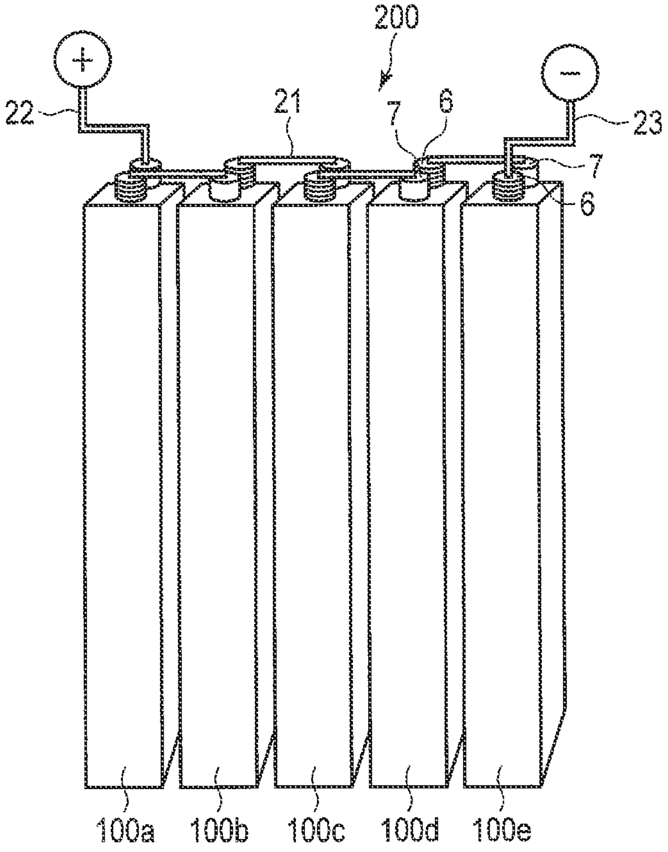
FIG. 12 is a perspective view schematically showing an example of a battery module according to an embodiment.

FIG. 12 is a perspective view schematically showing an example of the battery module according to the third embodiment. The battery module 200 shown in FIG. 12 includes five single-batteries 100*a* to 100*e*, four bus bars 21, a positive electrode-side lead 22, and a negative electrode-side lead 23. Each of the five single-batteries 100*a* to 100*e* is the secondary battery according to the second embodiment.

The bus bar 21 connects, for example, a negative electrode terminal 6 of one single-battery 100*a* and a positive electrode terminal 7 of the single-battery 100*b* positioned adjacent. In such a manner, five single-batteries 100 are thus connected in series by the four bus bars 21. That is, the battery module 200 shown in FIG. 12 is a battery module of five-in-series connection. Although no example is depicted in drawing, in a battery module including plural single-batteries that are electrically connected in parallel, for example, the plural single-batteries may be electrically connected by having plural negative electrode terminals being connected to each other by bus bars while having plural positive electrode terminals being connected to each other by bus bars.

The positive electrode terminal 7 of at least one battery among the five single-batteries 100*a* to 100*e* is electrically connected to the positive electrode-side lead 22 for external connection. In addition, the negative electrode terminal 6 of at least one battery among the five single-batteries 100*a* to 100*e* is electrically connected to the negative electrode-side lead 23 for external connection.

The battery module according to the third embodiment includes the secondary battery according to the second embodiment. Therefore, the battery module is excellent in input/output performance.

Fourth Embodiment

According to a fourth embodiment, a battery pack is provided. The battery pack includes a battery module according to the third embodiment. The battery pack may include a single secondary battery according to the second embodiment, in place of the battery module according to the third embodiment.

The battery pack according to the fourth embodiment may further include a protective circuit. The protective circuit has a function to control charging and discharging of the secondary battery. Alternatively, a circuit included in equipment where the battery pack serves as a power source (for example, electronic devices, automobiles, and the like) may be used as the protective circuit for the battery pack.

Moreover, the battery pack according to the fourth embodiment may further include an external power distribution terminal. The external power distribution terminal is configured to externally output current from the secondary battery, and/or to input external current into the secondary battery. In other words, when the battery pack is used as a power source, the current is provided out via the external power distribution terminal. When the battery pack is charged, the charging current (including regenerative energy of motive force of vehicles such as automobiles) is provided to the battery pack via the external power distribution terminal.

Next, an example of a battery pack according to the fourth embodiment will be described with reference to the drawings.

Figure 13:
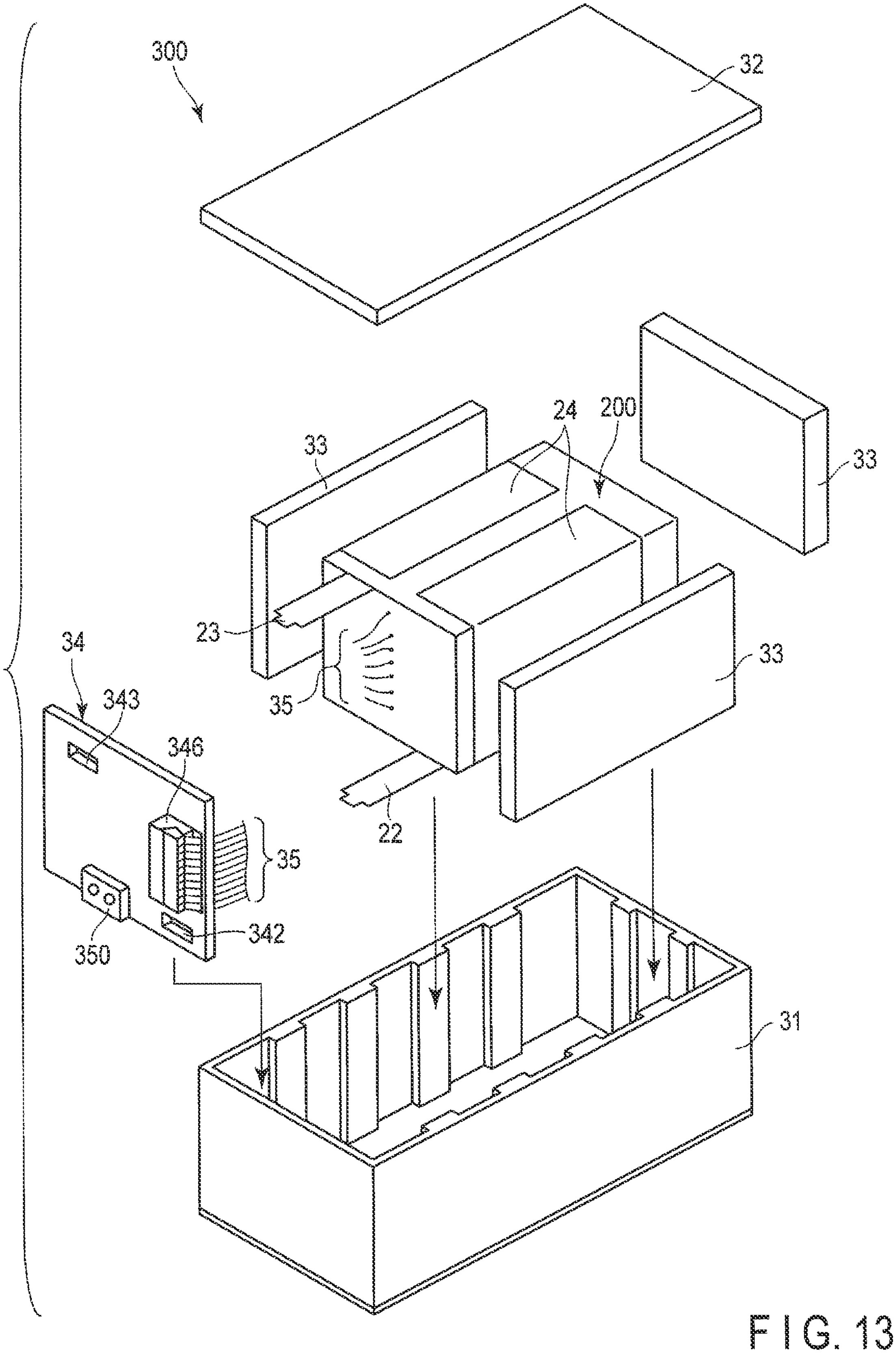
FIG. 13 is an exploded perspective view schematically showing an example of a battery pack according to an embodiment.
Figure 14:
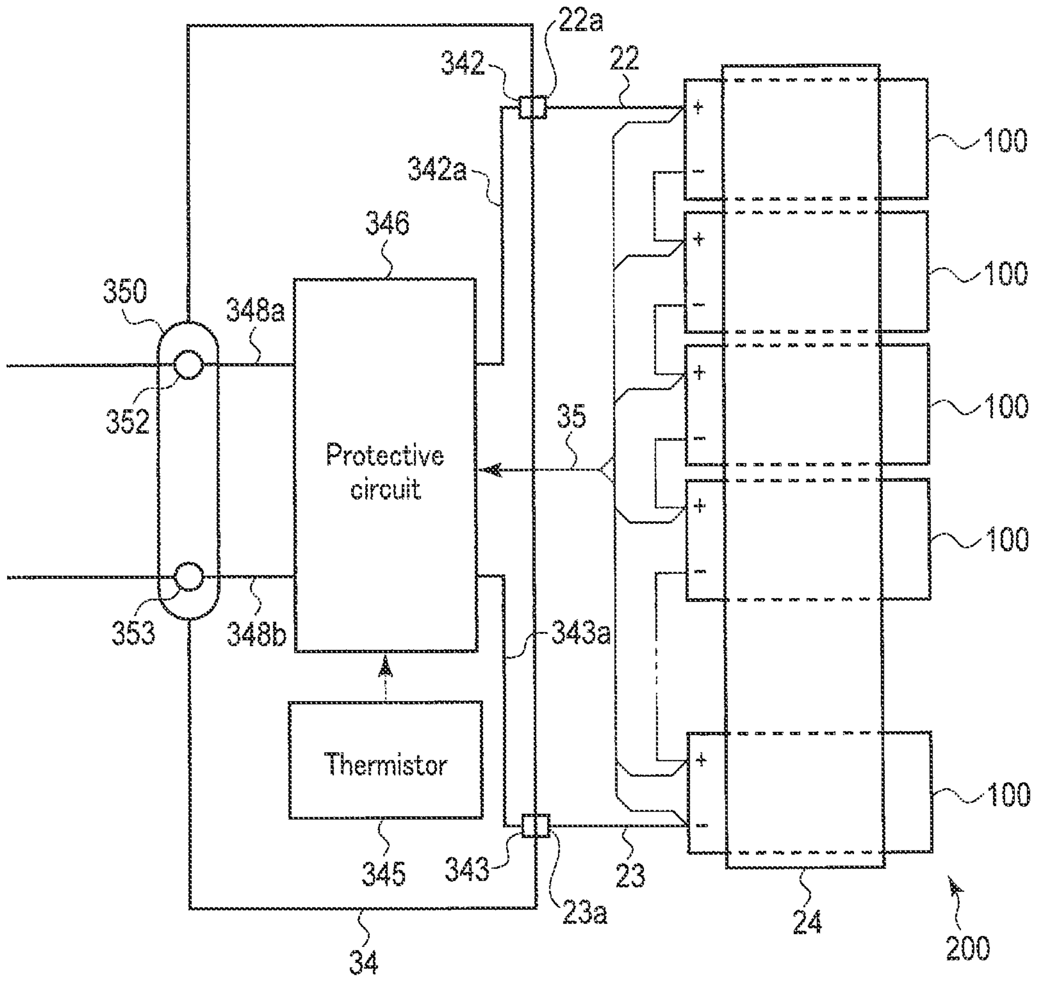
FIG. 14 is a block diagram showing an example of an electric circuit of the battery pack shown in FIG. 13.

FIG. 13 is an exploded perspective view schematically showing an example of the battery pack according to the fourth embodiment. FIG. 14 is a block diagram showing an example of an electric circuit of the battery pack shown in FIG. 13.

A battery pack 300 shown in FIGS. 13 and 14 includes a housing container 31, a lid 32, protective sheets 33, a battery module 200, a printed wiring board 34, wires 35, and an insulating plate (not shown).

The housing container 31 shown in FIG. 13 is a prismatic bottomed container having a rectangular bottom surface. The housing container 31 is configured to be capable of housing the protective sheets 33, the battery module 200, the printed wiring board 34, and the wires 35. The lid 32 has a rectangular shape. The lid 32 covers the housing container 31 to house the battery module 200 and such. Although not illustrated, the housing container 31 and the lid 32 are provided with openings, connection terminals, or the like for connection to an external device or the like.

The battery module 200 includes plural single-batteries 100, a positive electrode-side lead 22, a negative electrode-side lead 23, and adhesive tapes 24.

At least one of the plural single-batteries 100 is a secondary battery according to the second embodiment. The plural single-batteries 100 are electrically connected in series, as shown in FIG. 14. The plural single-batteries 100 may alternatively be electrically connected in parallel, or connected in a combination of in-series connection and in-parallel connection. If the plural single-batteries 100 are connected in parallel, the battery capacity increases as compared to a case in which they are connected in series.

The adhesive tapes 24 fasten the plural single-batteries 100. The plural single-batteries 100 may be fixed using a heat shrinkable tape in place of the adhesive tapes 24. In this case, protective sheets 33 are arranged on both side surfaces of the battery module 200, and the heat shrinkable tape is wound around the battery module 200 and protective sheets 33. After that, the heat shrinkable tape is shrunk by heating to bundle the plural single-batteries 100.

One end of the positive electrode-side lead 22 is connected to the battery module 200. The one end of the positive electrode-side lead 22 is electrically connected to the positive electrode(s) of one or more single-battery 100. One end of the negative electrode-side lead 23 is connected to the battery module 200. The one end of the negative electrode-side lead 23 is electrically connected to the negative electrode (s) of one or more single-battery 100.

The printed wiring board 34 is provided along one face in the short side direction among the inner surfaces of the housing container 31. The printed wiring board 34 includes a positive electrode-side connector 342, a negative electrode-side connector 343, a thermistor 345, a protective circuit 346, wirings **342*a* and 343*a*, an external power distribution terminal 350, a plus-side wiring (positive-side wiring) 348*a*, and a minus-side wiring (negative-side wiring) 348*b*. One principal surface of the printed wiring board 34 faces a surface of the battery module 200. An insulating plate (not shown) is disposed in between the printed wiring board 34 and the battery module 200**.

The other end **22*a* of the positive electrode-side lead 22 is electrically connected to the positive electrode-side connector 342. The other end 23*a* of the negative electrode-side lead 23 is electrically connected to the negative electrode side connector 343**.

The thermistor 345 is fixed to one principal surface of the printed wiring board 34. The thermistor 345 detects the temperature of each single-battery 100 and transmits detection signals to the protective circuit 346.

The external power distribution terminal 350 is fixed to the other principal surface of the printed wiring board 34. The external power distribution terminal 350 is electrically connected to device (s) that exists outside the battery pack 300. The external power distribution terminal 350 includes a positive-side terminal 352 and a negative-side terminal 353.

The protective circuit 346 is fixed to the other principal surface of the printed wiring board 34. The protective circuit 346 is connected to the positive-side terminal 352 via the plus-side wiring **348*a*. The protective circuit 346 is connected to the negative-side terminal 353 via the minus-side wiring 348*b*. In addition, the protective circuit 346 is electrically connected to the positive electrode-side connector 342 via the wiring 342*a*. The protective circuit 346 is electrically connected to the negative electrode-side connector 343 via the wiring 343*a*. Furthermore, the protective circuit 346 is electrically connected to each of the plural single-batteries 100 via the wires 35**.

The protective sheets 33 are arranged on both inner surfaces of the housing container 31 along the long side direction and on the inner surface along the short side direction facing the printed wiring board 34 across the battery module 200. The protective sheets 33 are made of, for example, resin or rubber.

The protective circuit 346 controls charge and discharge of the plural single-batteries 100. The protective circuit 346 is also configured to cut-off electric connection between the protective circuit 346 and the external power distribution terminal 350 (positive-side terminal 352, negative-side terminal 353) to external device(s), based on detection signals transmitted from the thermistor 345 or detection signals transmitted from each single-battery 100 or the battery module 200.

An example of the detection signal transmitted from the thermistor 345 is a signal indicating that the temperature of the single-battery(s) 100 is detected to be a predetermined temperature or more. An example of the detection signal transmitted from each single-battery 100 or the battery module 200 include a signal indicating detection of overcharge, over-discharge, and overcurrent of the single-battery (s) 100. When detecting over charge or the like for each of the single batteries 100, the battery voltage may be detected, or a positive electrode potential or negative electrode potential may be detected. In the latter case, a lithium electrode to be used as a reference electrode may be inserted into each single-battery 100.

Note, that as the protective circuit 346, a circuit included in a device (for example, an electronic device or an automobile) that uses the battery pack 300 as a power source may be used.

As described above, the battery pack 300 includes the external power distribution terminal 350. Hence, the battery pack 300 can output current from the battery module 200 to an external device and input current from an external device to the battery module 200 via the external power distribution terminal 350. In other words, when using the battery pack 300 as a power source, the current from the battery module 200 is supplied to an external device via the external power distribution terminal 350. When charging the battery pack 300, a charge current from an external device is supplied to the battery pack 300 via the external power distribution terminal 350. If the battery pack 300 is used as an onboard battery, the regenerative energy of the motive force of a vehicle can be used as the charge current from the external device.

Note that the battery pack 300 may include plural battery modules 200. In this case, the plural battery modules 200 may be connected in series, in parallel, or connected in a combination of in-series connection and in-parallel connection. The printed wiring board 34 and the wires 35 may be omitted. In this case, the positive electrode-side lead 22 and the negative electrode-side lead 23 may respectively be used as the positive-side terminal and negative-side terminal of the external power distribution terminal.

Such a battery pack 300 is used, for example, in applications where excellent cycle performance is demanded when a large current is extracted. More specifically, the battery pack 300 is used as, for example, a power source for electronic devices, a stationary battery, or an onboard battery for various kinds of vehicles. An example of the electronic device is a digital camera. The battery pack 300 is particularly favorably used as an onboard battery.

The battery pack according to the fourth embodiment is provided with the secondary battery according to the second embodiment or the battery module according to the third embodiment. Accordingly, the battery pack is excellent in input/output performance.

Fifth Embodiment

According to a fifth embodiment, a vehicle is provided. The battery pack according to the fourth embodiment is installed on this vehicle.

In the vehicle according to the fifth embodiment, the battery pack is configured, for example, to recover regenerative energy from motive force of the vehicle. The vehicle may include a mechanism (e.g., a regenerator) configured to convert kinetic energy of the vehicle into regenerative energy.

Examples of the vehicle according to the fifth embodiment include two-wheeled to four-wheeled hybrid electric automobiles, two-wheeled to four-wheeled electric automobiles, electrically assisted bicycles, and railway cars.

In the vehicle according to the fifth embodiment, the installing position of the battery pack is not particularly limited. For example, when installing the battery pack on an automobile, the battery pack may be installed in the engine compartment of the automobile, in rear parts of the vehicle body, or under seats.

The vehicle according to the fifth embodiment may have plural battery packs installed. In such a case, batteries included in each of the battery packs may be electrically connected to each other in series, electrically connected in parallel, or electrically connected in a combination of in-series connection and in-parallel connection. For example, in a case where each battery pack includes a battery module, the battery modules may be electrically connected to each other in series, electrically connected in parallel, or electrically connected in a combination of in-series connection and in-parallel connection. Alternatively, in a case where each battery pack includes a single battery, each of the batteries may be electrically connected to each other in series, electrically connected in parallel, or electrically connected in a combination of in-series connection and in-parallel connection.

An example of the vehicle according to the fifth embodiment is explained below, with reference to the drawings.

Figure 15:
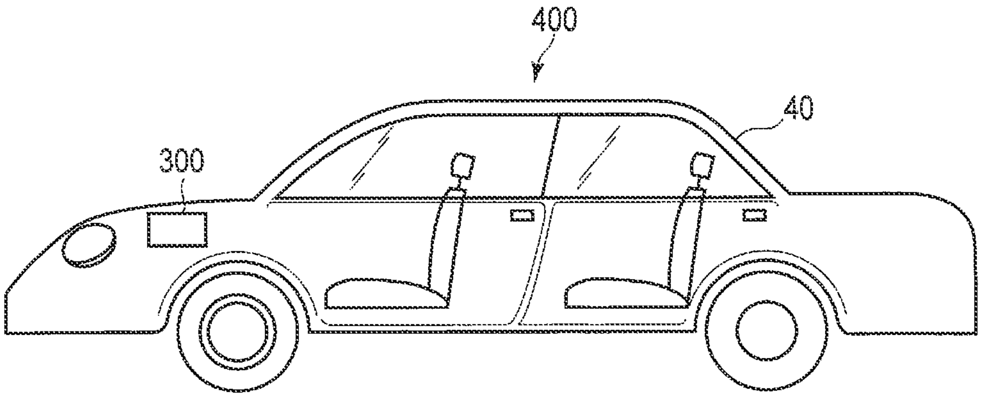
FIG. 15 is a partially see-through diagram schematically showing an example of a vehicle according to an embodiment.

FIG. 15 is a partially see-through diagram schematically showing an example of a vehicle according to the fifth embodiment.

A vehicle 400, shown in FIG. 15 includes a vehicle body 40 and a battery pack 300 according to the fourth embodiment. In the example shown in FIG. 15, the vehicle 400 is a four-wheeled automobile.

This vehicle 400 may have plural battery packs 300 installed. In such a case, the batteries (e.g., single-batteries or battery module) included in the battery packs 300 may be connected in series, connected in parallel, or connected in a combination of in-series connection and in-parallel connection.

In FIG. 15, depicted is an example where the battery pack 300 is installed in an engine compartment located at the front of the vehicle body 40. As mentioned above, for example, the battery pack 300 may be alternatively installed in rear sections of the vehicle body 40, or under a seat. The battery pack 300 may be used as a power source of the vehicle 400. The battery pack 300 can also recover regenerative energy of motive force of the vehicle 400.

Figure 16:
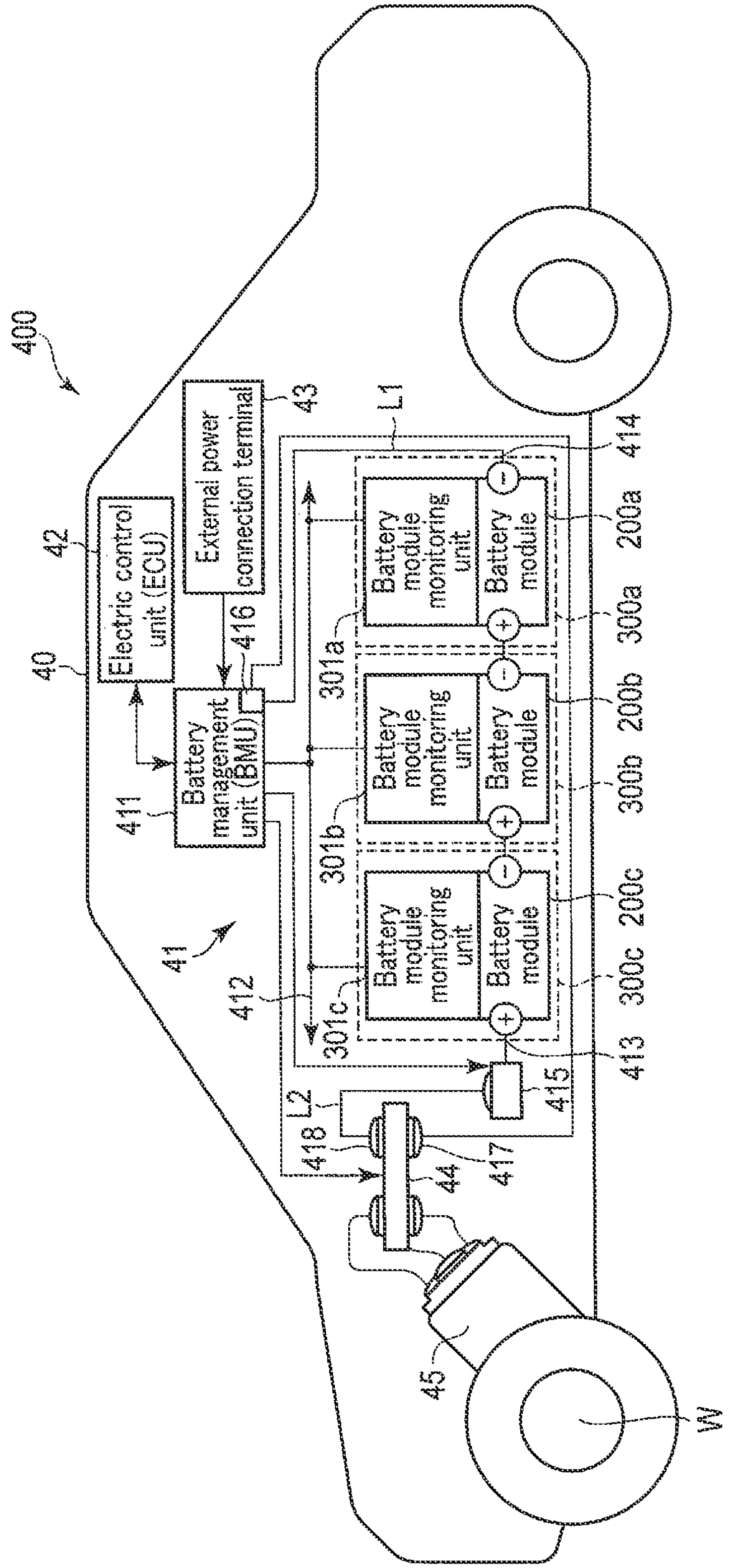
FIG. 16 is a diagram schematically showing an example of a control system related to an electric system in the vehicle according to an embodiment.

Next, with reference to FIG. 16, an aspect of operation of the vehicle according to the fifth embodiment is explained.

FIG. 16 is a diagram schematically showing an example of a control system related to an electric system in the vehicle according to the fifth embodiment. A vehicle 400, shown in FIG. 16, is an electric automobile.

The vehicle 400, shown in FIG. 16, includes a vehicle body 40, a vehicle power source 41, a vehicle ECU (electric control unit) 42, which is a master controller of the vehicle power source 41, an external terminal (an external power connection terminal) 43, an inverter 44, and a drive motor 45.

The vehicle 400 includes the vehicle power source 41, for example, in the engine compartment, in the rear sections of the automobile body, or under a seat. In FIG. 16, the position of the vehicle power source 41 installed in the vehicle 400 is schematically shown.

The vehicle power source 41 includes plural (for example, three) battery packs **300*a*, 300*b* and 300*c*, a battery management unit (BMU) 411, and a communication bus 412**.

The battery pack **300*a* includes a battery module 200*a* and a battery module monitoring unit 301*a* (e.g., a VTM: voltage temperature monitoring). The battery pack 300*b* includes a battery module 200*b* and a battery module monitoring unit 301*b*. The battery pack 300*c* includes a battery module 200*c* and a battery module monitoring unit 301*c*. The battery packs 300*a* to 300*c* are battery packs similar to the aforementioned battery pack 300, and the battery modules 200*a* to 200*c* are battery modules similar to the aforementioned battery module 200. The battery modules 200*a* to 200*c* are electrically connected in series. The battery packs 300*a*, 300*b* and 300*c* can each be independently removed, and may be exchanged by a different battery pack 300**.

Each of the battery modules **200*a* to 200*c* includes plural single-batteries connected in series. At least one of the plural single-batteries is the secondary battery according to the second embodiment. The battery modules 200*a* to 200*c* each perform charging and discharging via a positive electrode terminal 413 and a negative electrode terminal 414**.

The battery management unit 411 performs communication with the battery module monitoring units 301*a* to 301*c* and collects information such as voltages or temperatures for each of the single-batteries 100 included in the battery modules 200*a* to 200*c* included in the vehicle power source 41. In this manner, the battery management unit 411 collects information concerning security of the vehicle power source 41.

The battery management unit 411 and the battery module monitoring units 301*a* to 301*c* are connected via the communication bus 412. In the communication bus 412, a set of communication lines is shared at multiple nodes (i.e., the battery management unit 411 and one or more battery module monitoring units 301*a* to 301*c*). The communication bus 412 is, for example, a communication bus configured based on CAN (Control Area Network) standard.

The battery module monitoring units 301*a* to 301*c* measure a voltage and a temperature of each single-battery in the battery modules 200*a* to 200*c* based on commands from the battery management unit 411. It is possible, however, to measure the temperatures only at several points per battery module, and the temperatures of all of the single-batteries need not be measured.

The vehicle power source 41 may also have an electromagnetic contactor (for example, a switch unit 415 shown in FIG. 16) for switching on and off electrical connection between the positive electrode terminal 413 and the negative electrode terminal 414. The switch unit 415 includes a precharge switch (not shown), which is turned on when the battery modules 200*a* to 200*c* are charged, and a main switch (not shown), which is turned on when output from the battery modules 200*a* to 200*c* is supplied to a load. The precharge switch and the main switch each include a relay circuit (not shown), which is switched on or off based on a signal provided to a coil disposed near the switch elements. The magnetic contactor such as the switch unit 415 is controlled based on control signals from the battery management unit 411 or the vehicle ECU 42, which controls the operation of the entire vehicle 400.

The inverter 44 converts an inputted direct current voltage to a three-phase alternate current (AC) high voltage for driving a motor. Three-phase output terminal(s) of the inverter 44 is (are) connected to each three-phase input terminal of the drive motor 45. The inverter 44 is controlled based on control signals from the battery management unit 411 or the vehicle ECU 42, which controls the entire operation of the vehicle. Due to the inverter 44 being controlled, output voltage from the inverter 44 is adjusted.

The drive motor 45 is rotated by electric power supplied from the inverter 44. The drive generated by rotation of the motor 45 is transferred to an axle and driving wheels W via a differential gear unit, for example.

The vehicle 400 also includes a regenerative brake mechanism, though not shown. The regenerative brake mechanism (e.g., a regenerator) rotates the drive motor 45 when the vehicle 400 is braked, and converts kinetic energy into regenerative energy, as electric energy. The regenerative energy, recovered in the regenerative brake mechanism, is inputted into the inverter 44 and converted to direct current. The converted direct current is inputted into the vehicle power source 41.

One terminal of a connecting line L1 is connected to the negative electrode terminal 414 of the vehicle power source 41. The other terminal of the connecting line L1 is connected to a negative electrode input terminal 417 of the inverter 44. A current detector (current detecting circuit) 416 in the battery management unit 411 is provided on the connecting line Li in between the negative electrode terminal 414 and negative electrode input terminal 417.

One terminal of a connecting line L2 is connected to the positive electrode terminal 413 of the vehicle power source 41. The other terminal of the connecting line L2 is connected to a positive electrode input terminal 418 of the inverter 44. The switch unit 415 is provided on the connecting line L2 in between the positive electrode terminal 413 and the positive electrode input terminal 418.

The external terminal 43 is connected to the battery management unit 411. The external terminal 43 is able to connect, for example, to an external power source.

The vehicle ECU 42 performs cooperative control of the vehicle power source 41, switch unit 415, inverter 44, and the like, together with other management units and control units including the battery management unit 411 in response to inputs operated by a driver or the like. Through the cooperative control by the vehicle ECU 42 and the like, output of electric power from the vehicle power source 41, charging of the vehicle power source 41, and the like are controlled, thereby performing the management of the whole vehicle 400. Data concerning the security of the vehicle power source 41, such as a remaining capacity of the vehicle power source 41, are transferred between the battery management unit 411 and the vehicle ECU 42 via communication lines.

The vehicle according to the fifth embodiment is installed with the battery pack according to the fourth embodiment. Thus, by being provided with the battery pack with excellent input/output performance, the vehicle can exhibit high performance.

EXAMPLES

Examples will be described hereinafter, but the embodiments of the present invention are not limited to the examples listed below, so long as the embodiments do not depart from the spirit of the invention.

<Electrode Preparation>

Example 1

First, the inorganic solid particles were mixed in N-methyl-2-pyrrolidone so that the solid content was 60%, and dispersed using a bead mill manufactured by Ashizawa Finetech Ltd. (STARMILL LME4), thereby preparing the first slurry. The first slurry was prepared under the dispersion conditions of bead diameter of (0.1 mm, bead filling rate of 60%, and stirring rate of 700 rpm. For the inorganic solid particles, $Li_{1.5}Al_{0.5}Ti_{1.5}(PO_4)_3$ having an average particle size of 0.5 μm and a lithium ion conductivity of $1\times10^{-4}$ S/cm was used. Hereinafter, this inorganic solid particle will be referred to as LATPO1.

An active material, granular carbon, and binder were mixed into the first slurry, and the mixture was stirred using a planetary mixer, followed by further stirring treatment by the bead mill, thereby preparing the second slurry. The second slurry was prepared under the dispersion conditions of bead diameter of Φ2 mm, bead filling rate of 60%, and stirring rate of 1000 rpm. As the active material, particles of lithium-containing nickel manganese cobalt composite oxide $LiNi_{0.5}Mn_{0.2}Co_{0.3}O_2$ having an average particle size of 6.4 μm were used. As the granular carbon, acetylene black having an average particle size of 0.2 μm was used. As the binder, polyvinylidene fluoride was used. In the second slurry, the amounts of inorganic solid particles, granular carbon, and binder with respect to 100 parts by mass of the active material were 3 parts by mass, 3 parts by mass, and 2 parts by mass, respectively.

Next, the second slurry was applied onto both surfaces of a current collector and the applied coat was dried to obtain an active material-containing layer. For the current collector, an aluminum alloy foil having a thickness of 12 μm was used. The current collector and the active material-containing layer were subjected to press treatment, whereby an electrode was obtained. The active material-containing layer had a density of 3.3 $g/cm^3$.

Examples 2 and 3

In Examples 2 and 3, electrodes were prepared according to the same procedure as in Example 1, except that the conditions of the stirring treatment by the bead mill in preparing the second slurry were changed as shown in Table 1 below.

Examples 4 to 7

In Examples 4 to 7, for the inorganic solid particles, $Li_{1.5}Al_{0.5}Ti_{1.5}(PO_4)_3$ having an average particle size of 0.7 μm and a lithium ion conductivity of $1\times10^{-4}$ S/cm was used, in place of LATPO1. Hereinafter, this inorganic solid particle will be referred to as LATPO2. In Examples 4 to 7, electrodes were prepared according to the same procedure as in Example 1, except that LATPO2 was used in place of LATPO1, and the conditions of the bead mill dispersion in preparing the first slurry were changed as shown in Table 1 below.

Comparative Examples 1 and 2

In Comparative Examples 1 and 2, electrodes were prepared according to the same procedure as in Example 1, except that the conditions of the bead mill dispersion in preparing the first slurry or the conditions of the stirring treatment by the bead mill in preparing the second slurry were changed as shown in Table 1 below.

Table 1 below summarizes the conditions of preparing the electrode in each example and each comparative example. Specifically, the table shows the average particle size of each of LATPO1 and LATPO2 used as the inorganic solid particles before the bead mill treatment was performed, the conditions of the bead mill dispersion in preparing the first slurry, and the conditions of the stirring treatment by the bead mill in preparing the second slurry. For the conditions of the bead mill treatment in preparing the first slurry and the second slurry, the table shows the bead diameter, bead filling rate, and stirring rate.

TABLE 1

| | Prior to Bead Mill Inorganic | Bead Mill Dispersion Conditions for First Slurry Preparation | | | Bead Mill Dispersion Conditions for Second Slurry Preparation | | |
|---|---|---|---|---|---|---|---|
| | Solid Particle Diameter (μm) | Bead Diameter Φ (mm) | Bead Filling Rate (%) | Stirring Rate (rpm) | Bead Diameter Φ (mm) | Bead Filling Rate (%) | Stirring Rate (rpm) |
| Example 1 | 0.5 | 0.1 | 60 | 700 | 2 | 60 | 1000 |
| Example 2 | 0.5 | 0.1 | 60 | 700 | 1 | 60 | 1000 |
| Example 3 | 0.5 | 0.1 | 60 | 700 | 1 | 60 | 500 |
| Example 4 | 0.7 | 0.2 | 60 | 700 | 2 | 60 | 1000 |
| Example 5 | 0.7 | 0.2 | 60 | 1000 | 2 | 60 | 1000 |
| Example 6 | 0.7 | 0.2 | 60 | 1300 | 2 | 60 | 1000 |
| Example 7 | 0.7 | 1 | 60 | 1300 | 2 | 60 | 1000 |
| Comparative Example 1 | 0.5 | 0.1 | 60 | 200 | 2 | 60 | 1000 |
| Comparative Example 2 | 0.5 | 0.1 | 60 | 700 | 2 | 60 | 200 |

<Measurement of Log Differential Intrusion Distribution Curve>

By the above-described method, for the electrodes prepared in Examples 1 to 7 and Comparative Examples 1 and 2, the log differential intrusion distribution curves of the active material-containing layers according to mercury porosimetry were measured. For the active material-containing layers of all electrodes, the peak (first peak) indicating the highest log differential intrusion appeared within the range of 0.05 μm to 10 μm. From the obtained log differential intrusion distribution curve, the first pore volume corresponding to the most intense peak (first peak) and the second pore volume within the range of 0.005 μm to 0.02 μm were obtained, and the ratio of the first pore volume to the total pore volume and the ratio of the second pore volume to the first pore volume were calculated. The obtained results are shown in Table 2 below.

<Evaluation of Input/Output Performance>

A two-electrode coin cell was prepared to evaluate input/output performance (rate performance). For the working electrode, the electrodes prepared in Examples 1 to 7 and Comparative Examples 1 and 2 were used. The electrode had a size of Φ14 mm of a circular shape. For the counter electrode, lithium metal was used. For the electrolyte, a solution prepared by dissolving lithium hexafluorophosphate ($LiPF_6$) in a mixed solvent of ethylene carbonate and diethyl carbonate was used. The ratio of ethylene carbonate to diethyl carbonate in the mixed solvent was set to 1:2. The concentration of $LiPF_6$ was set to 1 mol/L. The amount of electrolyte was set to 200 μL.

First, the prepared coin cell was charged at a current density of 1 C in an environment of 25° C. until the state of charge (SOC) reached 100%. Thereafter, the coin cell was discharged at a current density of 1 C until the SOC dropped to 0%, to measure a 1 C discharge capacity. Furthermore, the coin cell was charged again at the current density of 1 C until the state of charge SOC reached 100%. Thereafter, the coin cell was discharged at a current density of 3 C until the SOC dropped to 0%, to measure a 3 C discharge capacity. The 3

C discharge capacity was divided by the 1 C discharge capacity to calculate a 3 C/1 C rate capacity ratio. The results are shown in Table 2 below.

TABLE 2

| | Ratio of First Pore Volume to Total Pore Volume (%) | Ratio of Second Pore Volume to First Pore Volume (%) | 3C/1C Rate Capacity Ratio (%) |
|---|---|---|---|
| Example 1 | 41 | 3.5 | 48 |
| Example 2 | 37 | 2.5 | 49 |
| Example 3 | 35 | 2.5 | 48 |
| Example 4 | 42 | 4.1 | 47 |
| Example 5 | 40 | 3.7 | 45 |
| Example 6 | 41 | 3.5 | 47 |
| Example 7 | 39 | 4.0 | 45 |
| Comparative Example 1 | 45 | 0 | 31 |
| Comparative Example 2 | 56 | 0 | 35 |

Table 2 shows that the electrodes prepared in Examples 1 to 7 had superior input/output performance than that of the electrodes prepared in Comparative Examples 1 and 2. For the electrodes prepared in Examples 1 to 7, the first peak whose peak top was the maximum log differential intrusion in the log differential intrusion distribution curve according to the mercury porosimetry had the first pore volume of a percentage within a range of 20% to 50% with respect to the total pore volume, and the ratio of the second pore volume in the range of 0.005 μm to 0.02 μm to the first pore volume was within a range of 0.1% to 5%. In contrast, for both Comparative Examples 1 and 2, the ratio of the second pore volume to the first pore volume was 0%. In addition, for the electrode prepared in Comparative Example 2, the percentage of the first pore volume with respect to the total pore volume exceeded 50%.

In Comparative Example 1, the stirring rate in the bead mill dispersion in preparing the first slurry was low, resulting in agglomeration of the inorganic solid particles (LATPO1) in the first slurry. Namely, as a result of the inorganic solid particles not being dispersed uniformly, the electrode did not have good input/output performance.

In Comparative Example 2, the stirring rate in the bead mill stirring treatment in preparing the second slurry was low, resulting in agglomeration of the inorganic solid particles (LATPO1) in the second slurry. Furthermore, it had been found that since the proportion of the first pore volume derived from the active material was high, the active material, inorganic solid particles and carbon material were not blended well. Consequently, the electrode did not have good input/output performance.

According to one or more embodiment and example described above, an electrode including an active material-containing layer is provided. The active material-containing layer includes an active material, inorganic solid particles having lithium ion conductivity, and a carbon material. The active material-containing layer exhibits a first peak indicating the maximum log differential intrusion in a log differential intrusion distribution curve according to mercury porosimetry. A pore size diameter $D_1$ of the first peak is 0.05 μm to 10 μm, and a first pore volume corresponding to the first peak is 20% to 50% relative to a total pore volume. A second pore volume within a range of 0.005 μm to 0.02 μm is 0.1% to 5% relative to the first pore volume. The electrode is excellent in input/output performance and can provide a secondary battery and battery pack excellent in input/output performance, and a vehicle with the battery pack installed thereon.

While certain embodiments of the present invention have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiment described herein may be made without departing from the spirit of the invention. The accompanying claims and their equivalents are intended to cover such embodiments or modifications as would fall within the scope and spirit of the inventions.

What is claimed is:

1. A positive electrode comprising an active material-containing layer,
   the active material-containing layer comprising:
      active material particles comprising one or more lithium-containing transition metal composite oxide, the lithium-containing transition metal composite oxide including lithium manganese composite oxides, lithium nickel composite oxides, lithium cobalt composite oxides, lithium nickel cobalt composite oxides, lithium manganese cobalt composite oxides, lithium manganese nickel composite oxides, lithium phosphates, and lithium nickel cobalt manganese composite oxides;
      inorganic solid particles having lithium ion conductivity; and
      a carbon material,
   the active material particles and the inorganic solid particles being dispersed within the active material-containing layer in such a manner that a first peak corresponds to a maximum log differential intrusion in a log differential intrusion distribution curve according to mercury porosimetry, a pore size diameter $D_1$ at the first peak is 0.05 μm to 10 μm, a first pore volume corresponding to the first peak is 20% to 50% with respect to a total pore volume within the active material-containing layer, and a ratio of a second pore volume, obtained by summing volumes of pores having pore size diameters of 0.005 μm to 0.02 μm relative to the first pore volume is 0.1% to 5%.

2. The electrode according to claim 1, wherein the active material comprises particles having an average primary particle size of 1 μm to 20 μm, and the inorganic solid particles have an average primary particle size of 0.2 μm to 2 μm.

3. A secondary battery comprising:
   the positive electrode according to claim 1;
   a negative electrode; and
   an electrolyte.

4. A battery pack comprising the secondary battery according to claim 3.

5. The battery pack according to claim 4, further comprising an external power distribution terminal and a protective circuit.

6. The battery pack according to claim 4, comprising plural of the secondary battery, the secondary batteries being electrically connected in series, in parallel, or in combination of in-series connection and in-parallel connection.

7. A vehicle comprising the battery pack according to claim 4.

8. The vehicle according to claim 7, wherein the vehicle comprises a mechanism configured to convert kinetic energy of the vehicle into regenerative energy.

* * * * *